US009121452B2

(12) United States Patent
Leonard et al.

(10) Patent No.: US 9,121,452 B2
(45) Date of Patent: Sep. 1, 2015

(54) TORSIONAL COUPLERS

(71) Applicant: Firestone Industrial Products Company, LLC, Indianapolis, IN (US)

(72) Inventors: Joshua R. Leonard, Noblesville, IN (US); Pradipta N. Moulik, Carmel, IN (US); Graham R. Brookes, Carmel, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/094,146

(22) Filed: Dec. 2, 2013

(65) Prior Publication Data

US 2014/0155180 A1 Jun. 5, 2014

Related U.S. Application Data

(60) Provisional application No. 61/732,190, filed on Nov. 30, 2012, provisional application No. 61/731,707, filed on Nov. 30, 2012, provisional application No. 61/804,593, filed on Mar. 22, 2013.

(51) Int. Cl.
*F16D 3/80* (2006.01)
*F16D 3/12* (2006.01)

(52) U.S. Cl.
CPC .. *F16D 3/12* (2013.01); *F16D 3/80* (2013.01); *F16D 2300/22* (2013.01)

(58) Field of Classification Search
USPC ..................................... 464/28, 73, 76, 81, 85
See application file for complete search history.

(56) References Cited

U.S. PATENT DOCUMENTS 2,301,660 A * 11/1942 Ricefield ........................ 464/73
2,833,131 A * 5/1958 Miller ............................ 464/28

FOREIGN PATENT DOCUMENTS

| EP | 0 023 246 A1 | * | 2/1981 | ....................... 464/28 |
| FR | 1.346.685 | * | 11/1963 | ....................... 464/28 |
| GB | 1037433 | * | 7/1966 | |
| SU | 632867 | * | 11/1978 | ....................... 464/28 |

* cited by examiner

*Primary Examiner* — Gregory Binda
(74) *Attorney, Agent, or Firm* — Jason A. Houser; Fay Sharpe LLP

(57) ABSTRACT

A torsional coupler can be dimensioned for securement between a rotational motion source and a rotational motion target. The torsional coupler can include a first end component and a second end component that can cooperatively interengage one another such that such that rotational motion imparted on the first end component is transmitted to the second end component. Interposed between the first end component and the second end component is one or more force-transfer elements through which torque and/or other rotational output is transmitted. The one or more force-transfer elements can include one or more pressurizable elements into and out of which pressurized fluid (e.g., gas and/or liquid) can be transferred. Additionally, or in the alternative, the one or more force-transfer elements can include one or more biasing elements having a positive stiffness and one or more biasing elements having a negative stiffness. A rotary power transmission is also included.

20 Claims, 15 Drawing Sheets

TORSIONAL COUPLERS

This application claims the benefit of U.S. Provisional Application No. 61/732,190, filed on Nov. 30, 2012; U.S. Provisional Application No. 61/731,707, filed on Nov. 30, 2012; and U.S. Provisional Application No. 61/804,593, filed on Mar. 22, 2013, each of which is hereby incorporated herein by reference in its entirety.

BACKGROUND

The subject matter of the present disclosure broadly relates to the art of rotational and/or torsional couplers and, more particularly, to constructions that are operative to transmit rotational and/or torsional loads while reducing transmission of rotational and/or torsional vibrations between driving and driven components. A rotary power transmission or system including one or more of such vibration isolators is also included.

It will be appreciated that the subject matter of the present disclosure is capable of broad application and use in connection with a variety of applications and/or environments in which rotational and/or torsional motion is transferred from a driving component to a driven component. Non-limiting examples of environments in which a coupler in accordance with the subject matter of the present disclosure is suitable for use can include light-duty (e.g., automotive) and heavy-duty (e.g., tractor and/or trailer) motor vehicle applications, industrial machinery and equipment applications, agricultural and farm machinery applications, marine power and drive applications, aeronautical applications, and/or power generation (e.g., wind turbine, gas turbine and electrical generator) applications.

In known drivetrain designs, power is often transmitted from one component to another through rotary motion in which torque is applied by a driving component to a corresponding driven component. Constructions of a wide variety of types, kinds, configurations and arrangements have been developed for use in transmitting such rotational and/or torsional motion, such as belt/pulley arrangements, sprocket/chain arrangements, mating gears, and rotary and/or torsional couplings, for example. In many cases, vibrations and/or other undesirable vibratory inputs can be generated by or otherwise communicated from the driving component to the driven component, such as, for example, may be due to imbalances or variations in the power generating device, imbalances or variations in the driving component, imbalances or variations in the driven component and/or misalignment between the driving and driven components.

In some cases, existing designs for rotational and/or torsional couplers, such as dual mass and centrifugal pendulum flywheel constructions, for example, have been used in an attempt to damp vibrations between driving and driven components. However, such designs are often deemed to provide effective damping over only a limited range of frequencies of vibration. In other cases, the transmission of undesirable vibrations could potentially be reduced through the use of a less rigid or otherwise more-compliant connection between the driving and driven components. However, torsional transmissions are typically sized or otherwise designed to withstand torsional loads within a particular load range and to maintain the desired level of performance at least within that load range. In many cases, reducing the rigidity or otherwise increasing the compliance of the torsional connection can result in a decrease in performance and/or other disadvantageous issues.

Notwithstanding the widespread usage and overall success of the wide variety of rotational and/or torsional transmission constructions that are known in the art, it is believed that a need exists to meet the foregoing and/or other competing goals while still providing comparable or improved performance, ease of manufacture, ease of assembly, ease of installation and/or reduced cost of manufacture.

BRIEF SUMMARY

One example of a torsional coupler in accordance with the subject matter of the present disclosure can be dimensioned for securement between an associated rotational motion source and an associated rotational motion target. The torsional coupler can include a first end component having an axis of rotation and a first component body. The first component body can include an end wall and a plurality of first lugs projecting from the end wall with each of the plurality of first lugs including opposing side surfaces. The plurality of first lugs can be disposed in circumferentially-spaced relation to one another about the axis such that the side surfaces of adjacent first lugs are disposed in facing relation to one another and such that a plurality of first recesses extend into the first component body with one of the first recesses disposed between adjacent ones of the first lugs. The torsional coupler can also include a second end component having an axis of rotation and a second component body. The second component body can include an end wall and a plurality of second lugs projecting from the end wall with each of the plurality of second lugs including opposing side surfaces. The plurality of second lugs can be disposed in circumferentially-spaced relation to one another about the axis such that the side surfaces of adjacent second lugs are disposed in facing relation to one another and such that a plurality of second recesses extend into the second component body with one of the second recesses disposed between adjacent ones of the second lugs. A plurality of pressurizable elements can include an element chamber constructed to receive and retain a quantity of pressurized fluid for an extended period of time. The first end component and the second end component can be at least approximately co-axially aligned with one another as well as axially positioned and rotationally oriented relative to one another such that each one of the plurality of first lugs is at least partially received within one of the plurality of second recesses and each one of the plurality of second lugs is at least partially received within one of the plurality of first recesses. Additionally the side surfaces of the plurality of first lugs can be disposed in facing relation and co-extensive with the side surfaces of the plurality of second lugs. The plurality of pressurizable elements can be disposed between side surfaces of adjacent ones of the pluralities of first and second lugs such that rotational motion imparted on one of the first and second end components can be transmitted to the other of the first and second end components through the plurality of pressurizable elements in at least one direction of rotation about the axis.

One example of a rotary power transmission in accordance with the subject matter of the present disclosure can include a rotational motion source configured to generate rotational motion. A rotational motion target can be configured to be driven by the rotational motion source. A torsional coupler according to the foregoing paragraph can be operatively connected between the rotational motion source and the rotational motion target.

One example of a torsional coupler kit in accordance with the subject matter of the present disclosure can include a first end component having an axis of rotation and a first component body dimensioned for securement to one of an associated rotational motion source and an associated rotational motion target. The first component body can include a plurality of first lugs with each of the plurality of first lugs including opposing side surfaces. The plurality of first lugs can be disposed in circumferentially-spaced relation to one another about the axis such that the side surfaces of adjacent first lugs are disposed in facing relation to one another and such that a plurality of first recesses extend into the first component body with one of the first recesses disposed between adjacent ones of the first lugs. The torsional coupler kit can also include a second end component having an axis of rotation and a second component body dimensioned for securement to the other of an associated rotational motion source and an associated rotational motion target. The second component body can include a plurality of second lugs with each of the plurality of second lugs including opposing side surfaces. The plurality of second lugs can be disposed in circumferentially-spaced relation to one another about the axis such that the side surfaces of adjacent second lugs are disposed in facing relation to one another and such that a plurality of second recesses extend into the second component body with one of the second recesses disposed between adjacent ones of the second lugs. A plurality of pressurizable elements can include an element chamber constructed to receive and retain a quantity of pressurized fluid for an extended period of time. Each of said plurality of pressurizable elements can be dimensioned to be positioned between side surfaces of adjacent ones of the pluralities of first and second lugs such that rotational motion imparted on one of the first and second end components can be transmitted to the other of the first and second end components through the plurality of pressurizable elements in at least one direction of rotation about the axis.

Another example of a torsional coupler in accordance with the subject matter of the present disclosure can be dimensioned for securement between an associated rotational motion source and an associated rotational motion target. The torsional coupler can include a first end component having an axis of rotation and a first component body. The first component body can include a plurality of first lugs having a first side surface and a second side surface spaced peripherally from the first side surface. The plurality of first lugs can be disposed in circumferentially-spaced relation to one another about the axis such that a plurality of first recesses can extend into the first component body with one of the first recesses disposed between adjacent ones of the first lugs. A second end component can have an axis of rotation and a second component body. The second component body can include a plurality of second lugs having a first side surface and a second side surface spaced peripherally from the first side surface. The plurality of second lugs can be disposed in circumferentially-spaced relation to one another about the axis such that a plurality of second recesses can extend into the second component body with one of the second recesses disposed between adjacent ones of the second lugs. The first end component and the second end component can be at least approximately co-axially aligned with one another as well as axially positioned and rotationally oriented relative to one another such that each one of the plurality of first lugs is at least partially received within one of the plurality of second recesses and each one of the plurality of second lugs is at least partially received within one of the plurality of first recesses and with the side surfaces of the plurality of first lugs being disposed in facing relation and co-extensive with the side surfaces of the plurality of second lugs. A plurality of force-transfer elements can be disposed between side surfaces of adjacent ones of the pluralities of first and second lugs such that rotational motion imparted on one of the first and second end components can be transmitted to the other of the first and second end components through the plurality of force-transfer elements and at least one direction of rotation about the axis.

Another example of a rotary power transmission in accordance with the subject matter of the present disclosure can include a rotational motion source configured to generate rotational motion. A rotational motion target can be configured to be driven by the rotational motion source. A torsional coupler according to the foregoing paragraph can be operatively connected between the rotational motion source and the rotational motion target.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
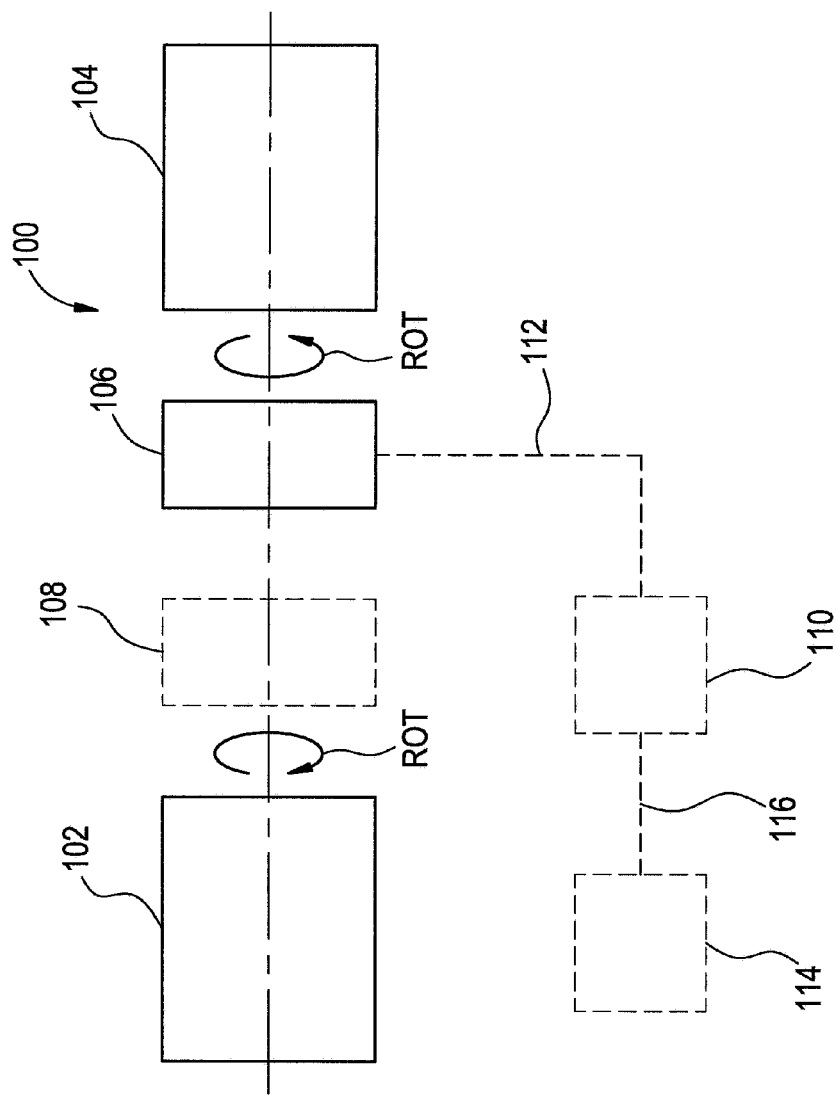
FIG. 1 is schematic representation of a drivetrain including a vibration isolator in accordance with the subject matter of the present disclosure.

FIG. 1 illustrates one example of a rotary power transmission or system 100 that includes a rotational motion source (which may also be referred to herein as a driving component) 102, a rotational motion target (which may also be referred to herein as a driven component) 104, and one or more torsional transmission devices, such as one or more torsional couplers 106, for example, in accordance with the subject matter of the present disclosure operatively disposed between the rotational motion source and the rotational motion target. In some cases, a torsional transmission device in accordance with the subject matter of the present disclosure can be alternately referred to herein as a torsional coupler, a rotational coupler or simply as a coupler. As such, rotational motion about an axis AX can be transmitted from rotational motion source 102 to rotational motion target 104, as is represented by arrows ROT in FIG. 1. It will be appreciated that such rotational motion can be in any direction of rotation and can operate within any suitable range of angular speeds, such as within a range of from approximately 1 RPM to approximately 50,000 RPM, for example. Additionally, it will be appreciated that such rotational motion can have any corresponding natural frequencies of rotational vibration associated with any such range of angular speeds.

A torsional transmission device in accordance with the subject matter of the present disclosure can function to isolate and/or otherwise reduce the transmission of torque oscillations and/or other rotational vibrations between the driving and driven components. In many cases, such torque oscillations and/or other rotational vibrations may be attributed to non-constant torque generation by the driving component and/or non-constant load generation by the driven component. Broadly, a torsional transmission device in accordance with the subject matter of the present disclosure can isolate and/or otherwise reduce the transmission of torque oscillations and/or other rotational vibrations by reducing the natural frequency of the torsional transmission device and thereby reducing the transmissibility of torque oscillations to downstream systems and/or components. It will be appreciated that such a reduction in natural frequency of the torsional transmission device can be achieved in any suitable manner.

As such, in some cases, one or more additional components can, optionally, be operatively connected between the coupler 106 and one or more of rotational motion source 102 and rotational motion target 104, such as is represented by (optional) component 108, for example. Non-limiting examples of such an additional component (e.g., component 108) can include one or more additional torsional transmission devices (e.g., coupler 106), such as may be tuned for isolation of different natural frequencies, for example, one or more clutches, one or more torque converters, one or more transmission components (e.g., gear sets, chain/sprocket sets, sheave/belt sets) and/or any combination thereof.

Additionally, rotational power transmission 100 can include one or more additional components and/or systems, such as may provide additional features and/or performance characteristics in connection with the operation and/or use of the rotational power transmission system and/or the one or more torsional transmission devices thereof. For example, coupler 106 can, in some cases, include one or more features and/or components that utilize pressurized fluid (e.g., gas and/or liquid). In such cases, rotational power transmission 100 can, optionally, include or can, optionally, be otherwise operatively associated with a pressurized fluid system 110, such as may include a pressurized fluid source (e.g., a compressor), a pressurized fluid storage device (e.g., a reservoir) and/or a pressurized fluid control device (e.g., a valve), for example. Such a pressurized fluid system, if provided, can be operatively connected with coupler 106 in any suitable manner, such as is represented in FIG. 1 by dashed line 112, for example. Furthermore, rotational power transmission 100 can, optionally, include or can, optionally, be otherwise operatively associated with a control system 114, such as may be adapted to selectively operate one or more components and/or features of pressurized fluid system 110, for example. Such a control system, if provided, can be operatively connected with pressurized fluid system 110, if provided, in any suitable manner, such as is represented in FIG. 1 by dashed line 116, for example.

It will be appreciated that the subject matter of the present disclosure is capable of broad use in a wide variety of applications and/or environments. Non-limiting examples of such applications and/or environments can include automotive applications, heavy-duty trucking applications, rail applications, marine applications, aeronautical applications, electrical power generation and/or industrial applications. As such, non-limiting examples of rotational motion sources or driving components can include electric motors, pneumatic motors, internal combustion engines, transmissions, and output components (e.g., output shafts and/or connections) thereof. Non-limiting examples of rotational motion targets or driven components can include electrical generators, transmissions, gearboxes, driveshafts and input components (e.g., input shafts, gears and/or connections) thereof.

Broadly, it is expected that a torsional transmission device in accordance with the subject matter of the present disclosure (e.g., coupler 106) may be capable of providing vibration damping and/or isolation of vibrations having a lower natural frequency than is currently believed to be known in the art. It will be recognized and appreciated that, in general, a coupling with a lower natural frequency will reduce the transmissibility (gain) of torque oscillations that are transmitted or otherwise passed on to downstream systems and/or components. As such, it will be appreciated that a torsional transmission device in accordance with the subject matter of the present disclosure can be of any suitable size, shape, form, configuration and/or construction.

Additionally, a torsional transmission device in accordance with the subject matter of the present disclosure (e.g., coupler 106) can include two rotating components that are operatively interengaged with one another such that rotational motion imparted on a first or driving component is transmitted to a second or driven component. It will be appreciated that the characterization of the components as being a "driving component" or a "driven component" is relative depending upon the direction that a torsional load is being transferred at a given instant in time. As such, it will be appreciated that such labels are merely intended to identify cooperative components capable of interengaging or otherwise operatively connecting with one another in accordance with the subject matter of the present disclosure and, thus, such a characterization and/or label is not intended to be limiting.

Furthermore, a torsional transmission device in accordance with the subject matter of the present disclosure (e.g., coupler 106) can include two rotating components that are operatively interengaged with one another such that rotational motion imparted on a first or driving component is transmitted to a second or driven component. Interposed between the driving component and the driven component is one or more force-transfer elements through which torque and/or other rotational output is transmitted.

In some cases, the one or more force-transfer elements can include one or more pressurizable elements into and out of which pressurized fluid (e.g., gas and/or liquid) can be transferred. In this manner, fluid pressures can be selectively applied to the pressurized of elements to thereby increase the load that can be transmitted by the torsional transmission device. One desirable characteristic of such a construction is that the fluid pressure can be adjusted to permit the torsional transmission device to carry the desired torsional load without the excess stiffness that is commonly associated with conventional constructions. As a result, a torsional transmission device according to the subject matter of the present disclosure can advantageously have a lower natural frequency than that of conventional couplings that utilize fixed elastomeric attachments, which commonly have a comparatively high stiffness in order to perform under the anticipated maximum torsional load conditions. However, the use of such comparatively high stiffness material typically corresponds to an undesirable increase in vibration transmissibility.

Additionally, or in the alternative, the one or more force-transfer elements can include one or more biasing elements having a positive stiffness and one or more biasing elements having a negative stiffness. In such cases, the inclusion of one or more biasing elements having a positive-stiffness and one or more biasing elements having a negative-stiffness can result in a torsional coupler construction having a reduced natural frequency. Since the natural frequency of a system or device is generally understood to be a function of spring rate, adding one or more force-transfer elements having a negative-stiffness will reduce the effective spring rate of the system of assembled components and, therefore, is expected to reduce the natural frequency of a torsional transmission device in accordance with the subject matter of the present disclosure.

Figure 2:
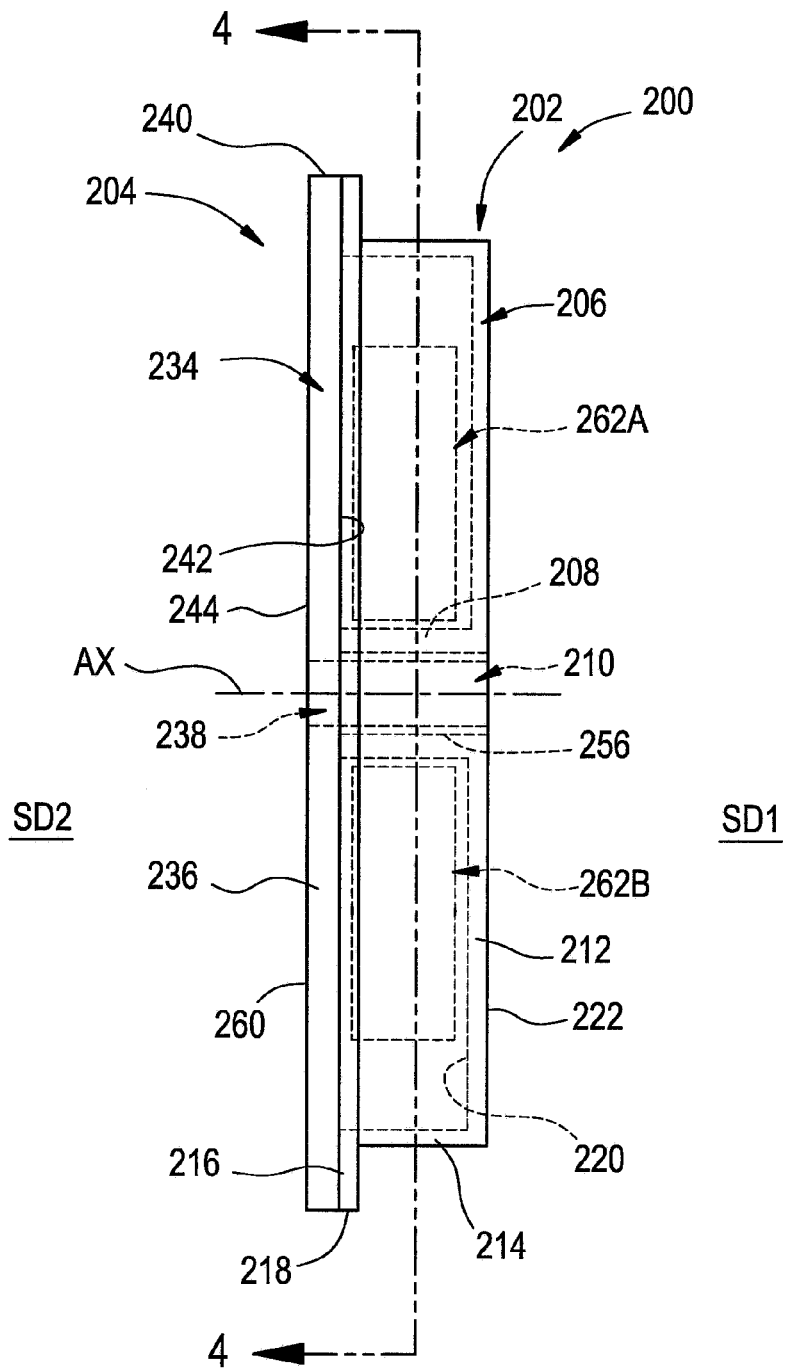
FIG. 2 is a side elevation view of one example of a torsional coupler in accordance with the subject matter of the present disclosure.
Figure 3:
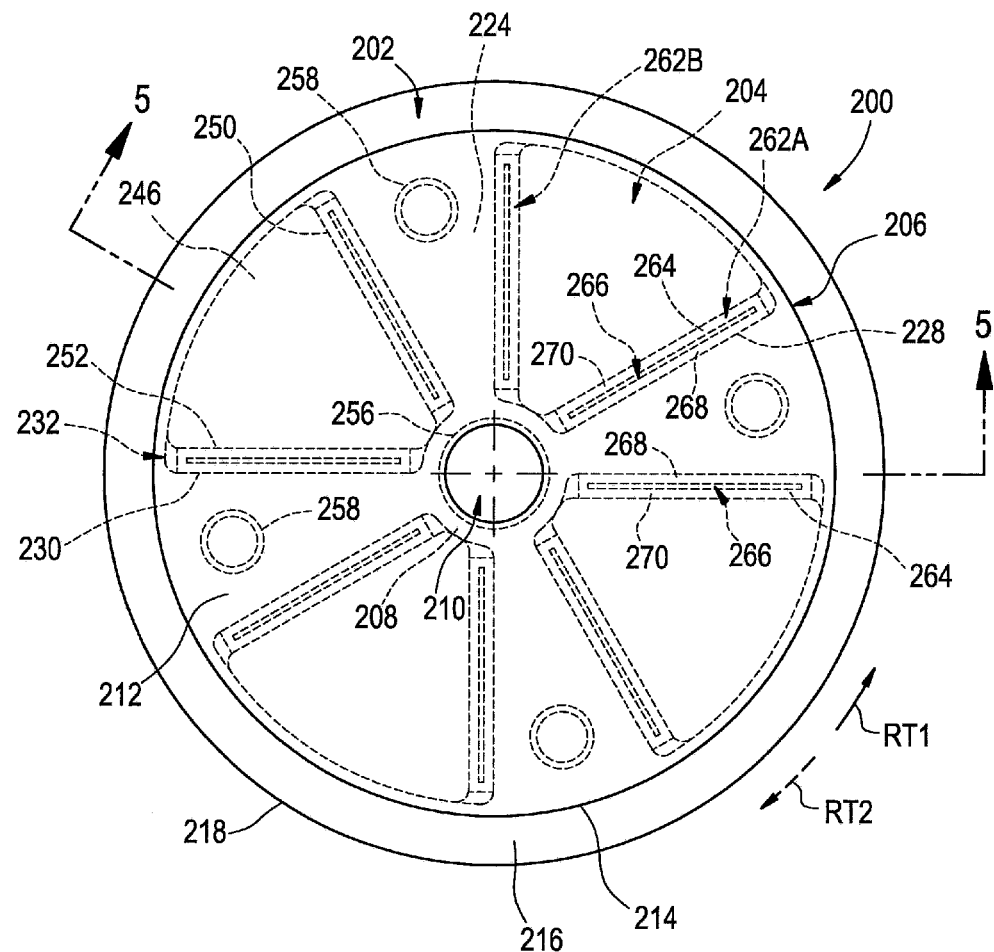
FIG. 3 is a front elevation view of the torsional coupler in FIG. 2.
Figure 4:
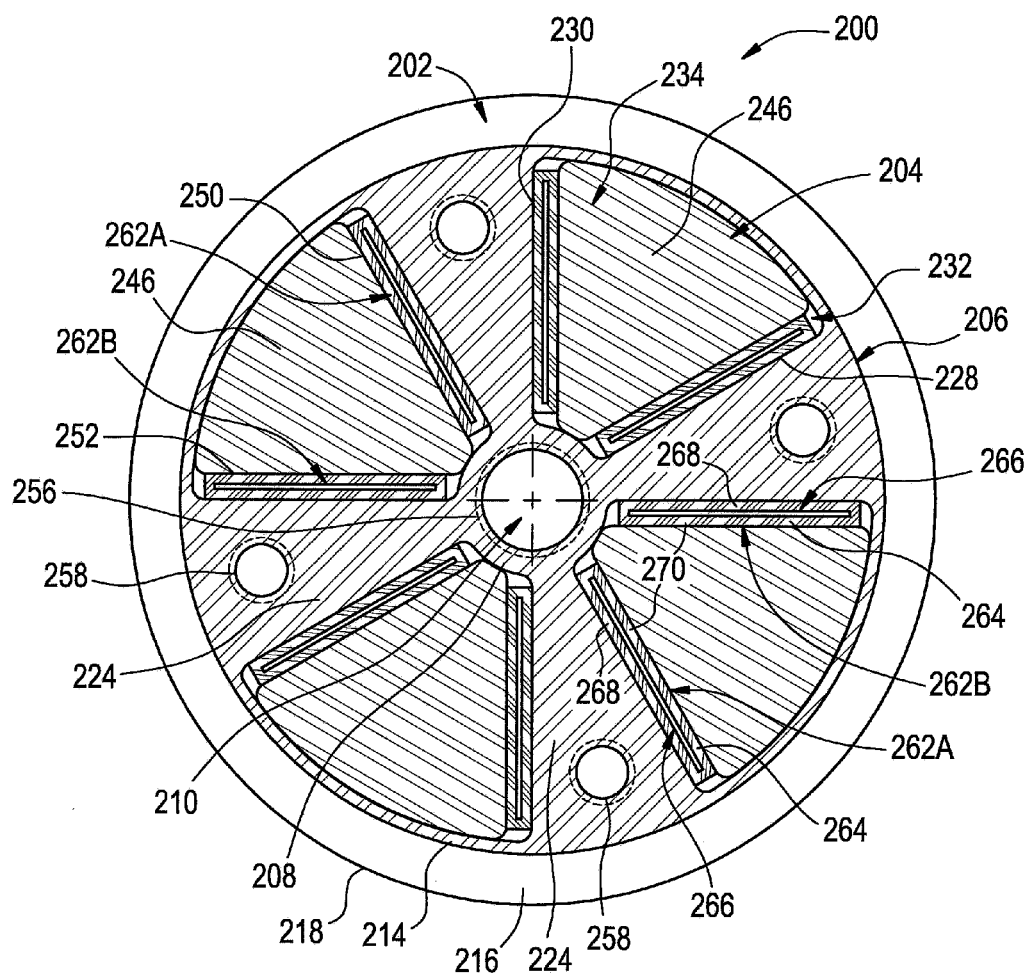
FIG. 4 is a cross-sectional view of the torsional coupler in FIGS. 2 and 3 taken from along line 4-4 in FIG. 2.
Figure 5:
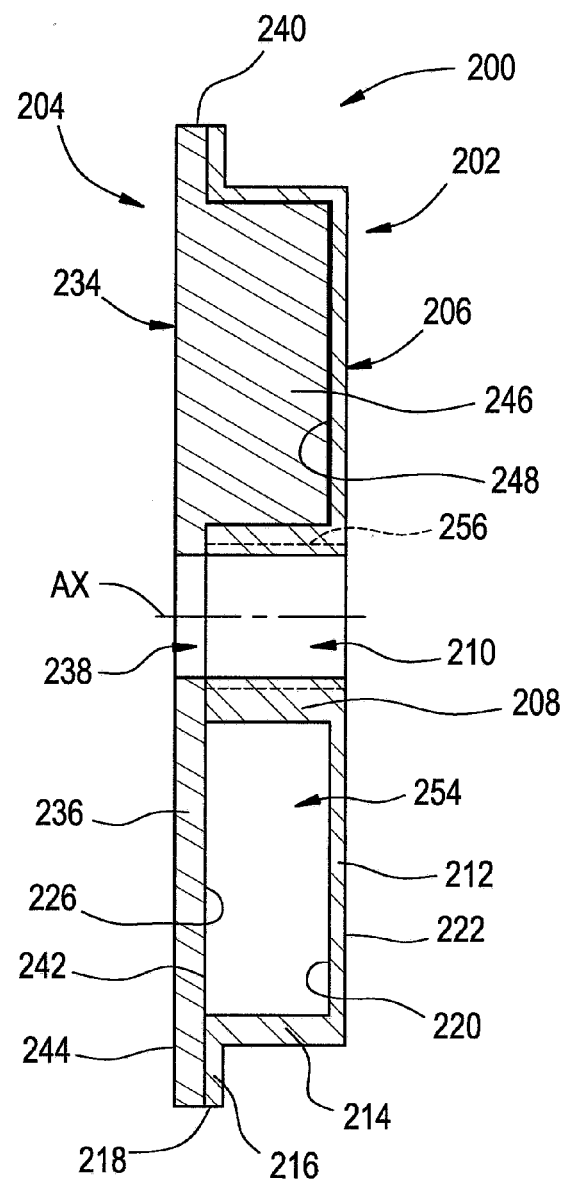
FIG. 5 is a cross-sectional view of the torsional coupler in FIGS. 2-4 taken from along line 5-5 in FIG. 3.

One example of a torsional transmission device in accordance with the subject matter of the present disclosure, such as may be suitable for use as coupler 106 in FIG. 1, for example, is identified as a coupler 200 in FIGS. 2-5. Coupler 200 can include an end member (or end component) 202 and an end member (or end component) 204 that are operatively interengaged with one another such that torsional and/or rotational output can be transmitted from one end component to the other in accordance with the subject matter of the present disclosure. In an assembled condition, coupler 200 can include axially-opposed sides, which are represented in FIGS. 3 and 5 by reference numbers SD1 and SD2. In some cases, one or more connection and/or securement features can be accessible from along either or both of sides SD1 and/or SD2, such as may be suitable for operatively connecting one or more end components (e.g., end member 202 and/or end member 204) to an associated rotational motion source (e.g., driving component 102) and/or an associated rotational motion target (e.g., driven component 104). As indicated above, however, it will be appreciated that labels such as "driven" and "driving" are merely indicative of a relative direction of torque transmission at a given point in time, and that such labels are not intended to be limiting.

End component 202 of torsional coupler 200 can include a component body 206 with an axis AX and an inner side wall 208 that at least partially defines a mounting passage 210. In some cases, mounting passage 210 can be dimensioned to receive and torsionally-engage a shaft or other feature of an associated driving or driven component (e.g., one of components 102 and/or 104 in FIG. 1), such as is discussed in detail hereinafter, for example. Component body 206 can also include an end wall 212 that extends outwardly from inner side wall 208. An outer side wall 214 can project axially from end wall 212 toward an outer flange wall 216 that can at least partially define an outer peripheral edge 218 of the component body, which can be of any suitable size, shape and/or configuration. Component body 206 can further include one or more inside surfaces 220 disposed in facing relation to end component 204 and an outside surface 222 facing away from end component 204.

Component body 206 can also include a plurality of projections or lugs 224 that can extend axially from along inside surfaces 220 in a direction away from the outside surface and can terminate at distal end surfaces 226 (FIG. 5), which can, in some cases, be oriented in approximate alignment with inside surface 220 and/or outside surface 222. It will be appreciated that lugs 224 can be of any suitable size, shape and/or and that any suitable quantity or arrangement of lugs can be used. In the arrangement shown in FIGS. 2-5, for example, component 202 includes four lugs that are disposed in spaced relation to one another peripherally about an axis AX of component body 206. Lugs 224 extend from along inside surfaces 220 of inner side wall 208 toward outer side wall 214 and can include opposing surfaces 228 and 230. Additionally, the spaced-apart relationship between adjacent lugs results in the generation of a plurality of recesses 232 (FIG. 4) that are disposed in spaced relation to one another peripherally about axis AX. In the configuration shown in FIGS. 2-5, recesses 232 are at least partially defined by inside surface 220 as well as surfaces 228 and 230 of adjacent lugs 224. It will be appreciated, however, that other configurations and/or arrangements could alternately be used.

End component 204 of torsional coupler 200 can include a component body 234 with an inner side wall 236 that at least partially defines a mounting passage 238, which can, optionally, be dimensioned to receive and torsionally-engage a shaft or other feature of an associated driving or driven component (e.g., one of components 102 and/or 104 in FIG. 1). Component body 234 can extend outwardly from inner side wall 236 to an outer peripheral edge 240 that can be of any suitable size, shape and/or configuration. Component body 234 can also include an inside surface 242 disposed in facing relation to end component 202 and an outside surface 244 facing away from end component 202.

Component body 234 can also include a plurality of projections or lugs 246 that extend axially outwardly from inside surface 242 in a direction away from the outside surface and terminate at distal end surfaces 248 (FIG. 5), which can, in some cases, be disposed in approximate alignment with inside surface 242. It will be appreciated that lugs 246, in a preferred arrangement, will be of any suitable size, shape and configuration as well as a suitable quantity and arrangement to be received within recesses 232 of end component 202. In the arrangement shown in FIGS. 2-5, for example, end component 204 includes four lugs that are disposed in spaced relation to one another peripherally about axis AX of component body 234. Lugs 246 extend from inner side wall 236 toward outer peripheral edge 240 and include opposing surfaces 250 and 252. Additionally, the spaced-apart relationship between adjacent lugs result in the generation of a plurality of recesses 254 that are disposed in spaced relation to one another peripherally about axis AX. In the configuration shown in FIGS. 2-5, recesses 254 are at least partially defined by surfaces 250 and 252 of adjacent lugs 246.

In a preferred arrangement, components 202 and 204 are assembled together to form torsional coupler 200 with surfaces 250 disposed in facing relation to surfaces 228 and with surfaces 252 disposed in facing relation to surfaces 230. In an assembled condition, components 202 and 204 are disposed in facing relation to one another such that lugs 224 are received in recesses 254 and lugs 246 are received in recesses 232. In this manner, torque and/or other rotational output could be transmitted from one of the end components to the other of the end components. In such case, end components 202 and 204 can rotate about axis AX in a common direction, as is indicated in FIGS. 2 and 4 by arrow RT1.

As discussed above, during use, one of end components 202 and 204 will function as a driving component and the other of end components 202 and 204 will function as a driven component of the torsional coupler. In the exemplary arrangement shown, for example, end component 202 can be operatively connected to a rotational power source and operate as the driving component with end component 204 operating as the driven component. It will be appreciated that end components 202 and 204 can be configured to operatively engage and for securement to a respective one of the driving and driven components, and that end components 202 and 204 can be so configured in any suitable manner and through the use of any suitable combination of features and/or elements.

For example, one or more connection and/or securement features can be provided on or along each of end components 202 and 204. Such one or more connection and/or securement features may be suitable for securing or otherwise operatively connecting end component 202 and/or end component 204 to an associated rotational motion source (e.g., driving component 102) and/or an associated rotational motion target (e.g., driven component 104). One non-limiting example of a suitable connection and/or securement feature can include an anti-rotation connection (not identified) having a non-circular cross-sectional shape or profile that is formed along at least a portion of inner side wall 208 of end component 202, such as may be suitable for forming a torque-transmitting connection with an associated shaft or other component, for example. It will be appreciated that such an anti-rotation connection can be formed in any suitable manner, such as by way of one or more spline walls or surfaces, which are represented in FIGS. 3 and 5 by dashed lines 256, that extend radially into and axially along at least a portion of inner side wall 208. As another non-limiting example, a plurality of securement features 258, which can take the form of threaded passages, for example, can extend at least partially into end component 204, such as from along an outer surface 260 thereof, for example. It will be appreciated, however, that other configurations and/or arrangements could alternately be used.

Additionally, one or more of the end components of the torsional coupler can include one or more pressurizable bladder elements operatively disposed between the two end components such that torsional loads and/or forces associated therewith are transmitted between the two components at least partially through the one or more pressurizable bladder elements. It will be appreciated that the one or more pressurizable bladder elements can be of any suitable size, shape, configuration and/or construction. In a preferred arrangement, however, the one or more pressurizable bladder elements include an element wall that at least partially defines a pressurizable bladder chamber constructed to receive and retain a quantity of pressurized fluid for an extended period of time (e.g., days, weeks, months or years).

Furthermore, the one or more pressurizable bladder elements can be adapted for fluid communication with an associated pressurized fluid system, such as may be suitable for selectively transferring pressurized fluid into and/or out of the one or more pressurizable bladder elements. For example, the one or more pressurizable bladders can include one or more fittings and/or connectors (not shown) disposed in fluid communication with the bladder chamber and suitable for use in operatively connecting with an associated pressurized fluid system (e.g., pressurized fluid system 110 by way of connection line 112).

Further still, it will be appreciated that any suitable pressurized fluid can be used and that the pressurized fluid system associated therewith can include any suitable components and/or systems. For example, in some cases, a pressurized liquid (e.g., hydraulic fluid) can be used as the working medium and the associated pressurized fluid system can include a pump, an accumulator, a control device (e.g., a valve assembly), and a control system for selectively operating the pump and/or control device. In other cases, a pressurized gas (e.g. air or nitrogen) can be used as the working medium and the associated pressurized fluid system can include a compressor, a reservoir, a control device, and a control system for selectively operating the compressor and/or control device.

In the arrangement shown in FIGS. 2-5, coupler 200 is shown as including a plurality of pressurizable bladder elements 262A and 262B are at least partially received within recesses 232 that are disposed between lugs 224 and/or recesses 254 that are disposed between lugs 246. It will be appreciated that any combination of pressurizable bladder elements 262A and/or 262B can be used. In some cases, different combinations of pressurizable bladder elements could be included based on the primary direction of rotation and whether (or not) substantial use in the opposing direction of rotation may be experienced by the coupler.

For example, pressurizable bladder elements 262A are shown as being disposed in abutting engagement with surfaces 228 of lugs 224 and surfaces 250 of lugs 246. In such cases, pressurizable bladder elements 262A can be compressively engaged between lugs 224 and 246 during rotation of coupler 200 about axis AX in the direction of arrow RT1. In such cases, elements 262B could take the form of elastomeric pads or other non-pressurizable elements. As another example, pressurizable bladder elements 262B are shown as being disposed in abutting engagement with surfaces 230 of lugs 224 and surfaces 252 of lugs 246. In such cases, pressurizable bladder elements 262B can be compressively engaged between lugs 224 and 246 during rotation of coupler 200 about axis AX in a common direction of rotation represented by arrow RT2 in FIG. 4. In such cases, elements 262A could take the form of elastomeric pads or other non-pressurizable elements. As a further example, a plurality of pressurizable bladder elements 262A and a plurality of pressurizable bladder elements 262B could be used, such as in cases in which co-rotation of the end components in two directions may be experienced, for example. In such cases, one or more additional elastomeric pads or other non-pressurizable elements (not shown) could, optionally, be included. It will be appreciated, however, that other configurations and/or arrangements could alternately be used.

Pressurizable bladder elements 262A and 262B are shown in FIGS. 2-5 as including a bladder wall 264 that at least partially defines a bladder chamber 266. Bladder wall 264 can include a first wall portion 268 disposed in abutting engagement with one of surfaces 228 and 230 of lugs 224, and a second wall portion 270 facing away from surfaces 228 and 230 in a direction toward lugs 246. In some cases, second wall portion 270 can be disposed in abutting engagement one of surfaces 250 and 252 of lugs 246. As discussed above, pressurizable bladder elements 262A and 262B can include any suitable fitting and/or connector (not shown) for permitting fluid communication between bladder chamber 266 and an associated pressurized fluid system. It will be appreciated that bladder wall 264 can be formed from any suitable material or combination of materials, such as a thermoplastic elastomer, natural rubber, synthetic rubber or any combination of these and/or other elastomeric materials.

Generally, pressurizable bladder elements 262A and 262B can operate such that torsional forces acting on end component 202 are transmitted to end component 204 through bladder wall 264 and the quantity of pressurized fluid contained within bladder chamber 266. It will be appreciated that recesses 232 are dimensioned to have a greater extent in one or more directions such that at least one of pressurizable bladder elements 262A and 262B as well as one of lugs 246 can be at least partially received within one of recesses 232.

Figure 6:
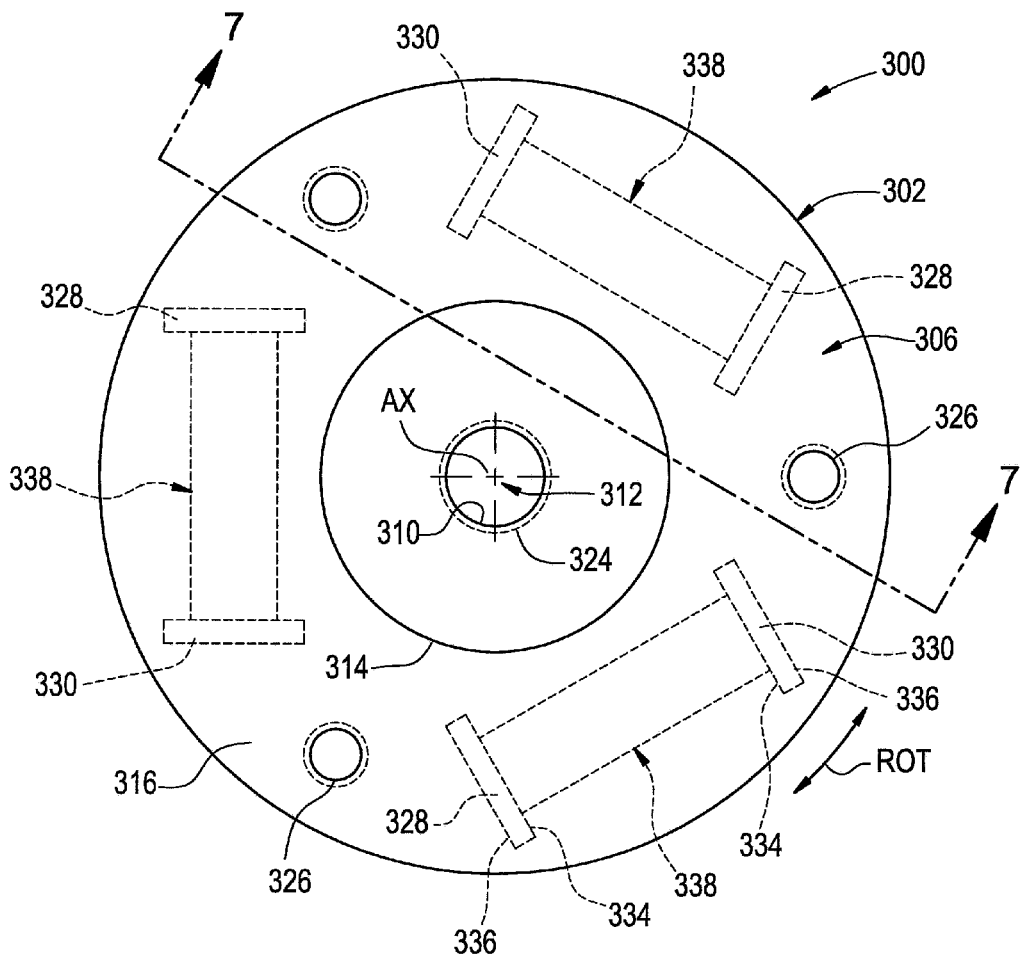
FIG. 6 is a front elevation view of another example of a torsional coupler in accordance with the subject matter of the present disclosure.
Figure 7:
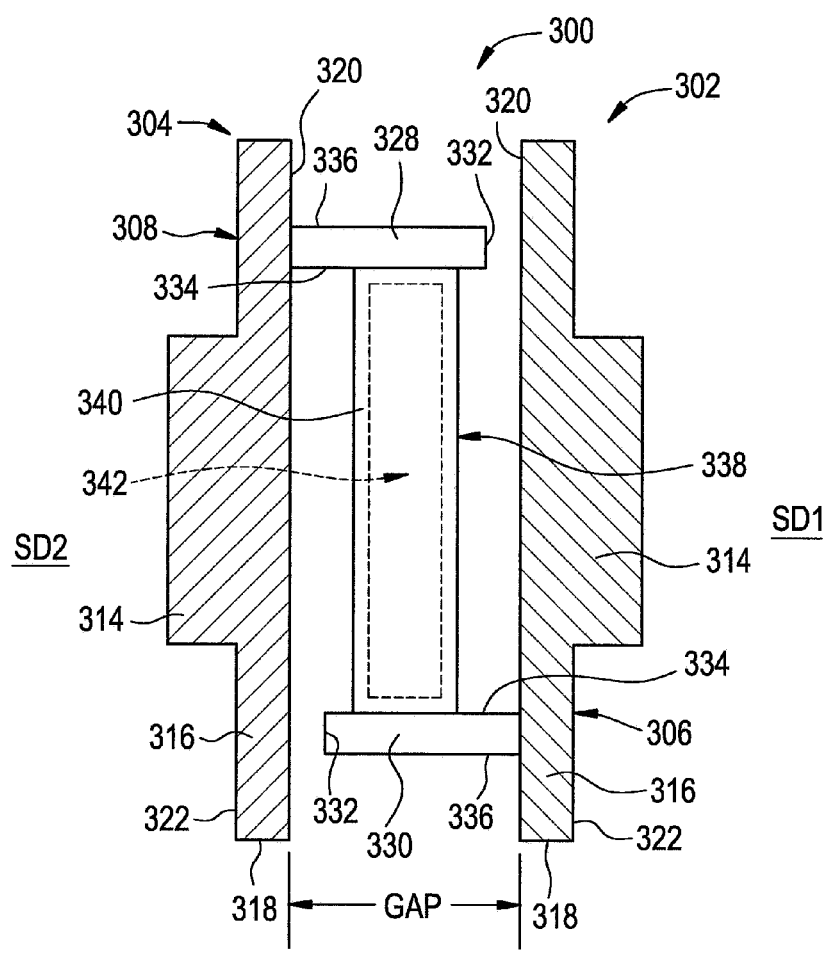
FIG. 7 is a cross-sectional view of a portion of the torsional coupler in FIG. 6 taken from along line 7-7 therein.

Another example of a torsional transmission device in accordance with the subject matter of the present disclosure is shown as a torsional coupler 300 in FIGS. 6 and 7. Coupler 300 can include an end member (or end component) 302 and an end member (or end component) 304 that are operatively interengaged with one another such that torsional and/or rotational output can be transmitted from one end component to the other in accordance with the subject matter of the present disclosure. In an assembled condition, coupler 300 can include axially-opposed sides, which are represented in FIG. 7 by reference numbers SD1 and SD2. In some cases, one or more connection and/or securement features can be accessible from along either or both of sides SD1 and/or SD2, such as may be suitable for operatively connecting one or more end components (e.g., end member 302 and/or end member 304) to an associated rotational motion source (e.g., driving component 102) and/or an associated rotational motion target (e.g., driven component 104). As indicated above, however, it will be appreciated that labels such as "driven" and "driving" are merely indicative of a relative direction of torque transmission at a given point in time, and that such labels are not intended to be limiting.

End components 302 and 304 are shown as including component bodies 306 and 308 that each include an inner side wall 310 that at least partially forms a mounting passage 312 dimensioned to receive an associated shaft or other associated component (not shown). Component bodies 306 and 308 can each include a hub wall portion 314 and a rim wall portion 316 disposed radially outwardly from the hub wall portion and terminating at an outer peripheral edge 318. Rim wall portions 316 can include opposing surfaces 320 and 322.

In a preferred arrangement, components 302 and 304 are oriented relative to one another such that surfaces 320 are disposed in facing relation to one another. Additionally, components 302 and 304 are shown in FIG. 7 as being disposed in axially-spaced relation to one another such that a gap is formed between surfaces 320, as is represented by reference dimension GAP. As discussed above, during use, one of end components 302 and 304 will function as a driving component and the other of end components 302 and 304 will function as a driven component of the torsional coupler. In the exemplary arrangement shown, for example, end component 302 can be operatively connected to a rotational power source and operate as the driving component with end component 304 operating as the driven component. It will be appreciated that end components 302 and 304 can be configured to operatively engage and for securement to a respective one of the driving and driven components, and that end components 302 and 304 can be so configured in any suitable manner and through the use of any suitable combination of features and/or elements.

For example, one or more connection and/or securement features can be provided on or along each of end components 302 and 304. Such one or more connection and/or securement features may be suitable for securing or otherwise operatively connecting end component 302 and/or end component 304 to an associated rotational motion source (e.g., driving component 102) and/or an associated rotational motion target (e.g., driven component 104). One non-limiting example of a suitable connection and/or securement feature can include an anti-rotation connection (not identified) having a non-circular cross-sectional shape or profile that is formed along at least a portion of inner side wall 310 of either one or both of end components 302 and/or 304, such as may be suitable for forming a torque-transmitting connection with an associated shaft or other component, for example. It will be appreciated that such an anti-rotation connection can be formed in any suitable manner, such as by way of one or more spline walls or surfaces, which are represented in FIGS. 6 and 7 by dashed lines 324. As another non-limiting example, a plurality of securement features 326, which can take the form of threaded passages, for example, can extend at least partially into either or both of end components 302 and 304. It will be appreciated, however, that other configurations and/or arrangements could alternately be used.

Component bodies 306 and 308 also include a plurality of connecting walls 328 and 330, respectively, that extend axially from along surface 320 and terminate at a distal edge 332. Connecting walls 328 and 330 include opposing surfaces 334 and 336. Additionally, a plurality of pressurizable elements 338 are operatively connected between surfaces 334 of connecting walls 328 and 330. In this manner, torque and/or other rotational output could be transmitted from one of the end components to the other of the end components. In such case, end components 302 and 304 can rotate about axis AX in a common direction, as is indicated in FIG. 6 by arrow ROT.

It will be appreciated that pressurizable elements 338 can be of any suitable type, kind, configuration and/or construction, such as fluid spring devices and/or actuators, for example. In some cases, pressurizable elements 338 can take the form of a pressurized gas spring including one or more walls 340, such as can include one or more rigid walls and a telescoping piston element, one or more flexible walls, and/or any combination thereof, for example. As such, it will be appreciated that walls 340 can be formed from any suitable material or combination of materials, such as substantially-rigid metal material, substantially-rigid thermoplastic materials, thermoplastic elastomer materials, natural rubber, synthetic rubber or any combination of these and/or other materials.

Regardless of the particular type and/or kind of construction that is employed, pressurizable elements 338 can, in a preferred arrangement, include a chamber 342 suitable for receiving and retaining a quantity of a suitable working fluid, such as has been described above. Additionally, it will be appreciated that any suitable pressurized fluid system can be operatively associated with the pressurizable elements and that any suitable fittings and/or connectors (not shown) can be used to permit fluid communication with chamber 342. Also, pressurizable elements 338 can be secured on or along connecting walls 328 and 330 in any suitable manner, such as by way of one or more securement devices (e.g., fasteners) and/or one or more flowed-material joints, for example.

Figure 8:
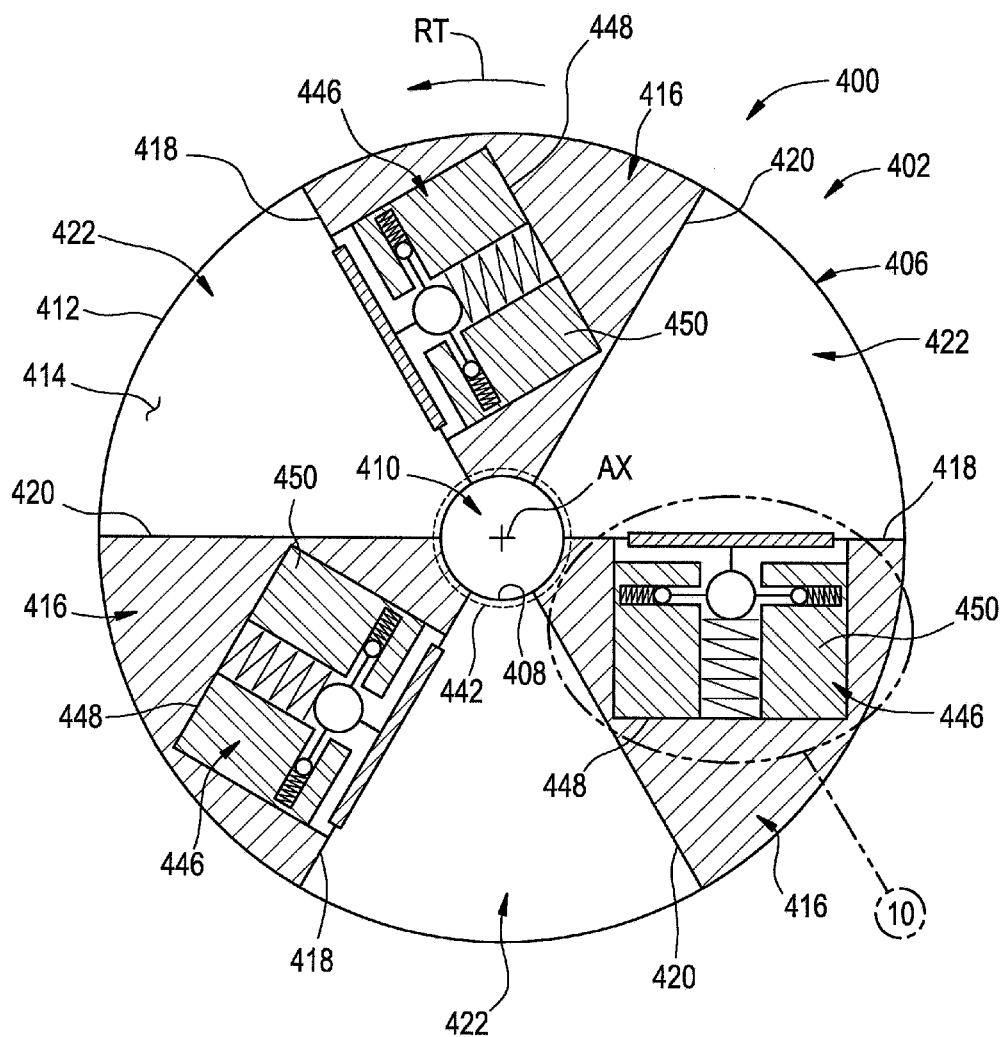
FIG. 8 is an elevation view, in partial cross-section, of one example of a component of a further example of a torsional coupler in accordance with the subject matter of the present disclosure.
Figure 9:
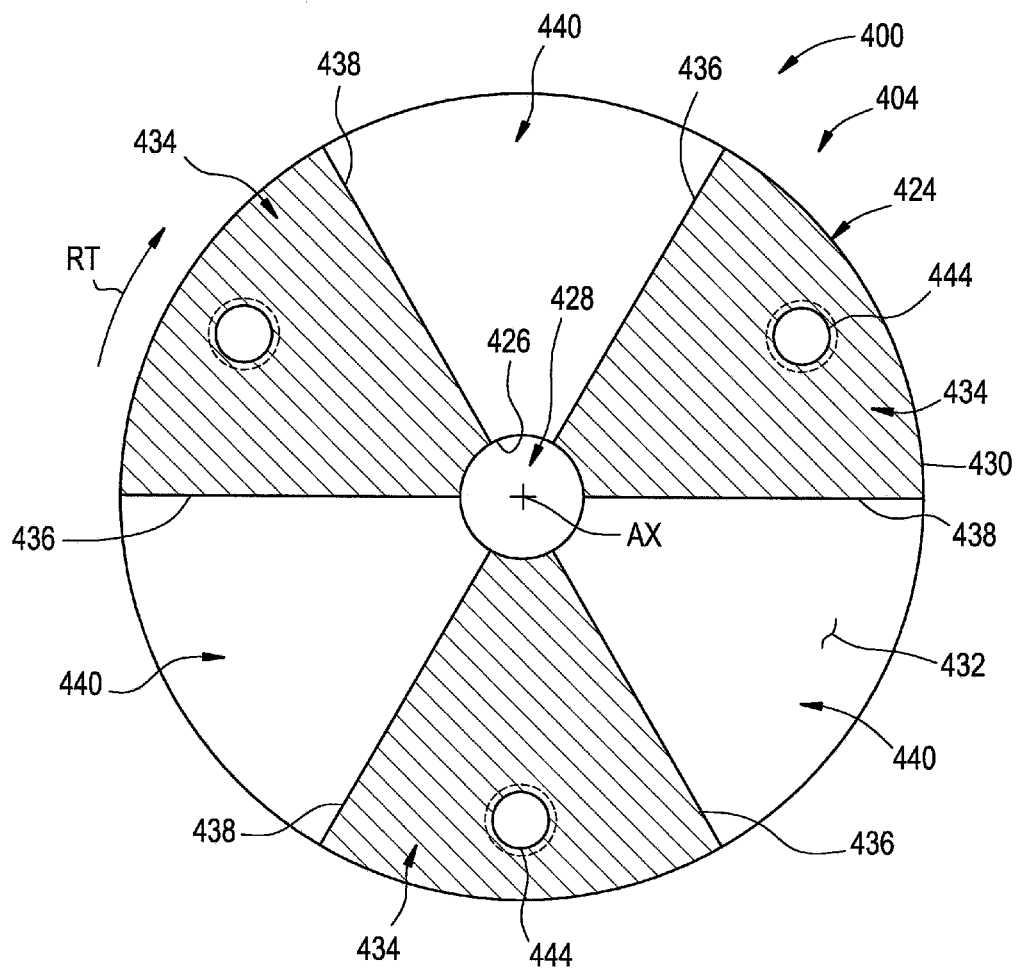
FIG. 9 is an elevation view, in partial cross-section, of one example of a mating component of the torsional coupler in FIG. 8.

A further example of a torsional transmission device in accordance with the subject matter of the present disclosure is shown as a torsional coupler 400 in FIGS. 8 and 9. Coupler 400 can include an end member (or end component) 402 (FIG. 8) and an end member (or end component) 404 (FIG. 9)

that are operatively interengaged with one another such that torsional and/or rotational output can be transmitted from one end component to the other in accordance with the subject matter of the present disclosure. In an assembled condition, such as is represented by the construction in FIG. 2, for example, coupler 400 can include axially-opposed sides, such as are represented in FIG. 2 by reference numbers SD1 and SD2. In some cases, one or more connection and/or securement features can be accessible from along either or both of sides SD1 and/or SD2, such as may be suitable for operatively connecting one or more end components (e.g., end member 402 and/or end member 404) to an associated rotational motion source (e.g., driving component 102) and/or an associated rotational motion target (e.g., driven component 104). As indicated above, however, it will be appreciated that labels such as "driven" and "driving" are merely indicative of a relative direction of torque transmission at a given point in time, and that such labels are not intended to be limiting.

With reference to FIG. 8, end component 402 of torsional coupler 400 can include a component body 406 with an inner side wall 408 that at least partially defines a mounting passage 410 that can be dimensioned to receive an associated shaft or other associated component (not shown). Component body 406 extends outwardly from inner side wall 408 to an outer peripheral edge 412 that can be of any suitable size, shape and/or configuration. Component body 406 also includes an inboard surface 414 disposed in facing relation to component 404 and an outboard surface (not shown) facing away from component 404.

Component body 406 includes a plurality of projections or lugs 416 that extend axially outward from inboard surface 414 in a direction away from the outboard surface and terminate at distal end surfaces (not shown), which can, in some cases, be disposed in an offset planar alignment with inboard surface 414. It will be appreciated that lugs 416 can be of any suitable size, shape and/or configuration, and that any suitable quantity or arrangement of lugs can be used. In the exemplary arrangement shown in FIG. 8, component 402 includes three lugs that are disposed in spaced relation to one another peripherally about an axis AX of component body 406. Lugs 416 extend from inner side wall 408 to outer peripheral edge 412 and include opposing surfaces 418 and 420. Additionally, the spaced-apart relationship between adjacent lugs result in the generation of a plurality of recesses 422 that are disposed in spaced relation to one another peripherally about axis AX. In the configuration shown in FIG. 8, recesses 422 are at least partially defined by inboard surface 414 as well as surfaces 418 and 420 of adjacent lugs 416. It will be appreciated, however, that other configurations and/or arrangements could alternately be used.

With reference to FIG. 9, component 404 of torsional coupler 400 can include a component body 424 with an inner side wall 426 that at least partially defines a mounting passage 428 that can be dimensioned to receive an associated shaft or other associated component (not shown). Component body 424 extends outwardly from inner side wall 426 to an outer peripheral edge 430 that can be of any suitable size, shape and/or configuration. Component body 424 also includes an inboard surface 432 disposed in facing relation to component 402 and an outboard surface (not shown) facing away from component 402.

Component body 406 can also include a plurality of projections or lugs 434 that extend axially outward from inboard surface 432 in a direction away from the outboard surface and terminate at distal end surfaces (not shown), which can, in some cases, be disposed in an offset planar alignment with inboard surface 432. It will be appreciated that lugs 434, in a preferred arrangement, will be of any suitable size, shape and configuration as well as a suitable quantity and arrangement for operatively interengaging corresponding lugs of component 402 such that torsional loads can be at least partially transferred thereby between components 402 and 404. In the exemplary arrangement shown in FIG. 9, component 404 includes three lugs that are disposed in spaced relation to one another peripherally about axis AX of component body 424. Lugs 434 extend from inner side wall 426 to outer peripheral edge 430 and include opposing surfaces 436 and 438. Additionally, the spaced-apart relationship between adjacent lugs result in the generation of a plurality of recesses 440 that are disposed in spaced relation to one another peripherally about axis AX. In the configuration shown in FIG. 9, recesses 440 are at least partially defined by inboard surface 432 as well as surfaces 436 and 438 of adjacent lugs 434.

In a preferred arrangement, components 402 and 404 are assembled together to form torsional coupler 400 with surfaces 436 disposed in facing relation to surfaces 418 and with surfaces 438 disposed in facing relation to surfaces 420. In an assembled condition, components 402 and 404 are disposed in facing relation to one another such that lugs 416 are at least partially received in recesses 440 and lugs 434 are at least partially received in recesses 422. In this manner, torque can be transmitted from one of the components to the other component. In such case, components 402 and 404 can rotate about axis AX in a common direction, as is indicated in FIGS. 8 and 9 by arrows RT, which illustrate that the components, as shown, are assembled in facing relation with one another.

As discussed above, during use, one of end components 402 and 404 will function as a driving component and the other of end components 402 and 404 will function as a driven component of the torsional coupler. In the exemplary arrangement shown, for example, end component 402 can be operatively connected to a rotational power source and operate as the driving component with end component 404 operating as the driven component. It will be appreciated that end components 402 and 404 can be configured to operatively engage and for securement to a respective one of the driving and driven components, and that end components 402 and 404 can be so configured in any suitable manner and through the use of any suitable combination of features and/or elements. As indicated above, however, it will be appreciated that labels such as "driven" and "driving" are merely indicative of a relative direction of torque transmission at a given point in time, and that such labels are not intended to be limiting.

For example, one or more connection and/or securement features can be provided on or along each of end components 402 and 404. Such one or more connection and/or securement features may be suitable for securing or otherwise operatively connecting end component 402 and/or end component 404 to an associated rotational motion source (e.g., driving component 102) and/or an associated rotational motion target (e.g., driven component 104). One non-limiting example of a suitable connection and/or securement feature can include an anti-rotation connection (not identified) having a non-circular cross-sectional shape or profile that is formed along at least a portion of inner side wall 408 of end component 402 and/or inner side wall 426 of end component 404, such as may be suitable for forming a torque-transmitting connection with an associated shaft or other component, for example. It will be appreciated that such an anti-rotation connection can be formed in any suitable manner, such as by way of one or more spline walls or surfaces, which are represented in FIG. 8 by dashed line 442. As another non-limiting example, a plurality of securement features 444, which can take the form of threaded passages, for example, can extend at least partially into either or both of end components 402 and 404, such as is shown in FIG. 9, for example. It will be appreciated, however, that other configurations and/or arrangements could alternately be used.

Additionally, one or more of the components of the torsional coupler can include one or more force-transfer elements through which torque and/or other rotational output is transmitted between the two components at least partially through the one or more force-transfer elements. It will be appreciated that the one or more force-transfer elements can be of any suitable size, shape, configuration and/or arrangement, and can be disposed on, along or otherwise associated with either or both of the two components in any combination. In the exemplary arrangements discussed hereinafter, the one or more force-transfer elements can include one or more positive-stiffness biasing elements as well as one or more negative-stiffness biasing elements.

Figure 10:
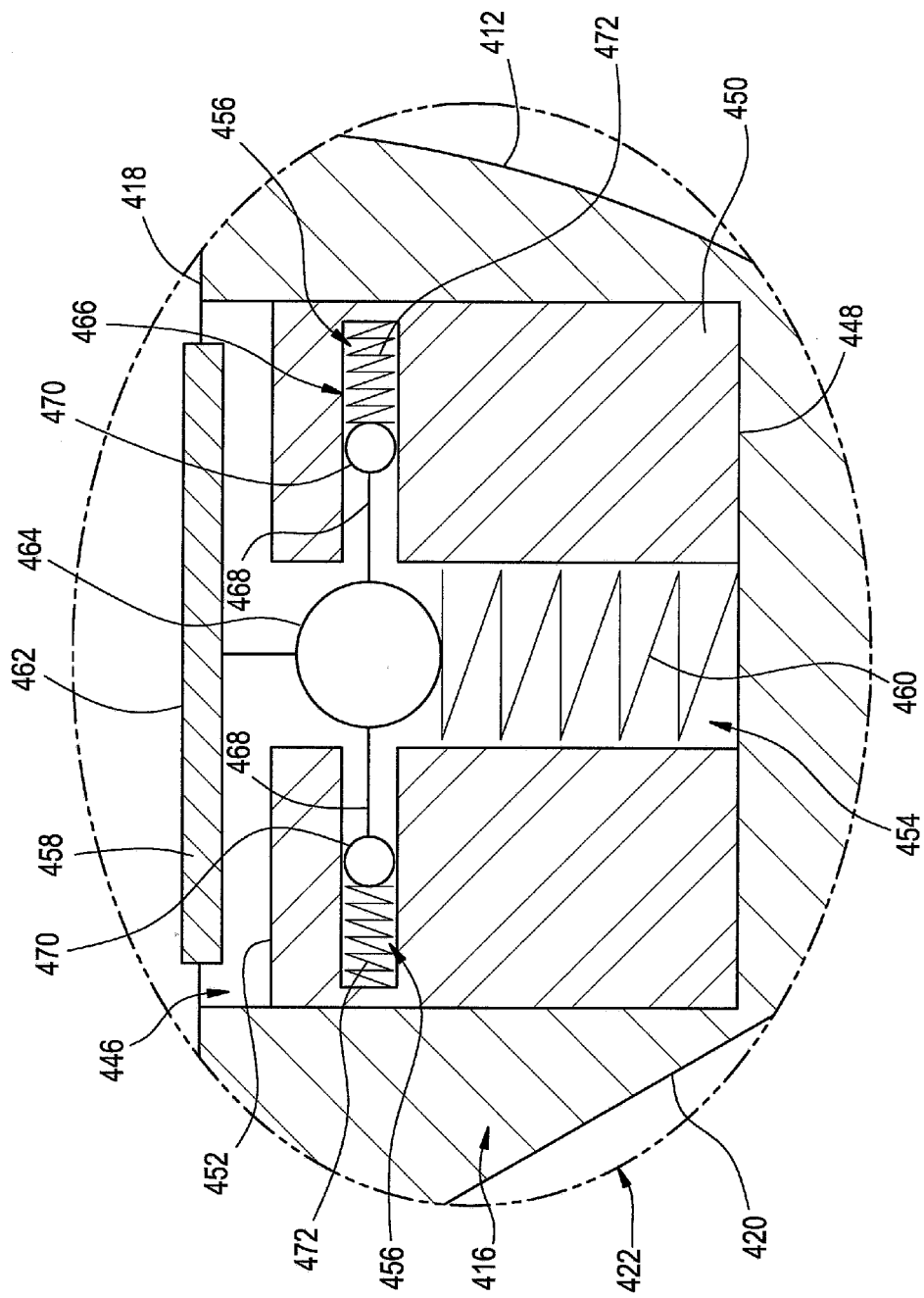
FIG. 10 is an enlarged view of the portion of the component in FIG. 8 identified as Detail 10 therein and illustrating one example of an isolator assembly in accordance with the subject matter of the present disclosure.

In the arrangement shown in FIGS. 8 and 10, component 402 includes a plurality of force-transfer elements that can be of any suitable type, kind, construction and/or configuration. As one non-limiting example, the plurality of force-transfer elements can take the form of a plurality of isolator assemblies 446 that are at least partially received within cavities 448 that extend into lugs 416 from along surfaces 418. It will be appreciated, however, that other configurations and/or arrangements could alternately be used and that such an arrangement is merely exemplary and not to be interpreted as limiting.

Isolator assemblies 446 can include an isolator block or housing 450 that is dimensioned to be received within one of cavities 448. Isolator block 450 can include an outer surface 452 disposed toward surface 418 of lugs 416. The isolator blocks can also include a passage 454 extending into the isolator block from along outer surface 452 and disposed transverse to surface 418. Isolator blocks 450 can further include one or more passages 456 that extend outwardly from along passage 454 in approximate alignment with outer surface 452 and/or surface 418.

Isolator assemblies 446 can also include a pressure pad 458 and a positive-stiffness biasing element 460 that is disposed within passage 454. Pressure pad 458 can include an outer surface 462, which can, in some cases, be disposed relative to surface 418 such that outer surface 462 extends beyond surface 418 and into recess 422. Pressure pad 458 and positive-stiffness biasing element 460 can be operatively connected with one another by way of a pivot element 464.

Isolator assemblies 446 also include a negative-stiffness biasing element 466 that is at least partially formed by one or more connecting members 468 that are at least partially disposed within one of passages 456 and pivotally connected to pivot element 464. Additionally, the one or more connecting members are pivotally supported on isolator block 450 by pivot elements 470. One or more biasing elements 472 can, optionally, operatively engage pivot elements 470 to thereby column-load or otherwise compress connecting members 468 to form negative-stiffness biasing element 466.

Generally, isolator assemblies 446 can operate such that torsional forces acting on component 402 are transmitted to component 404 through pressure pad 458, such as by outer surface 462 abuttingly engaging surface 436 of a lug of component 404. Positive-stiffness biasing element 456 can be dimensioned and include a positive stiffness (e.g., spring rate) sufficient to support pressure pad 458 under such torsional forces with a corresponding deflection. Negative-stiffness biasing element 466 can include a negative stiffness that substantially offsets the positive stiffness of biasing element 460. In this manner, the stiffness of the isolator assemblies can be made to approach zero while the positive-stiffness biasing element supports the forces and loads acting on pressure pad 458.

Figure 11:
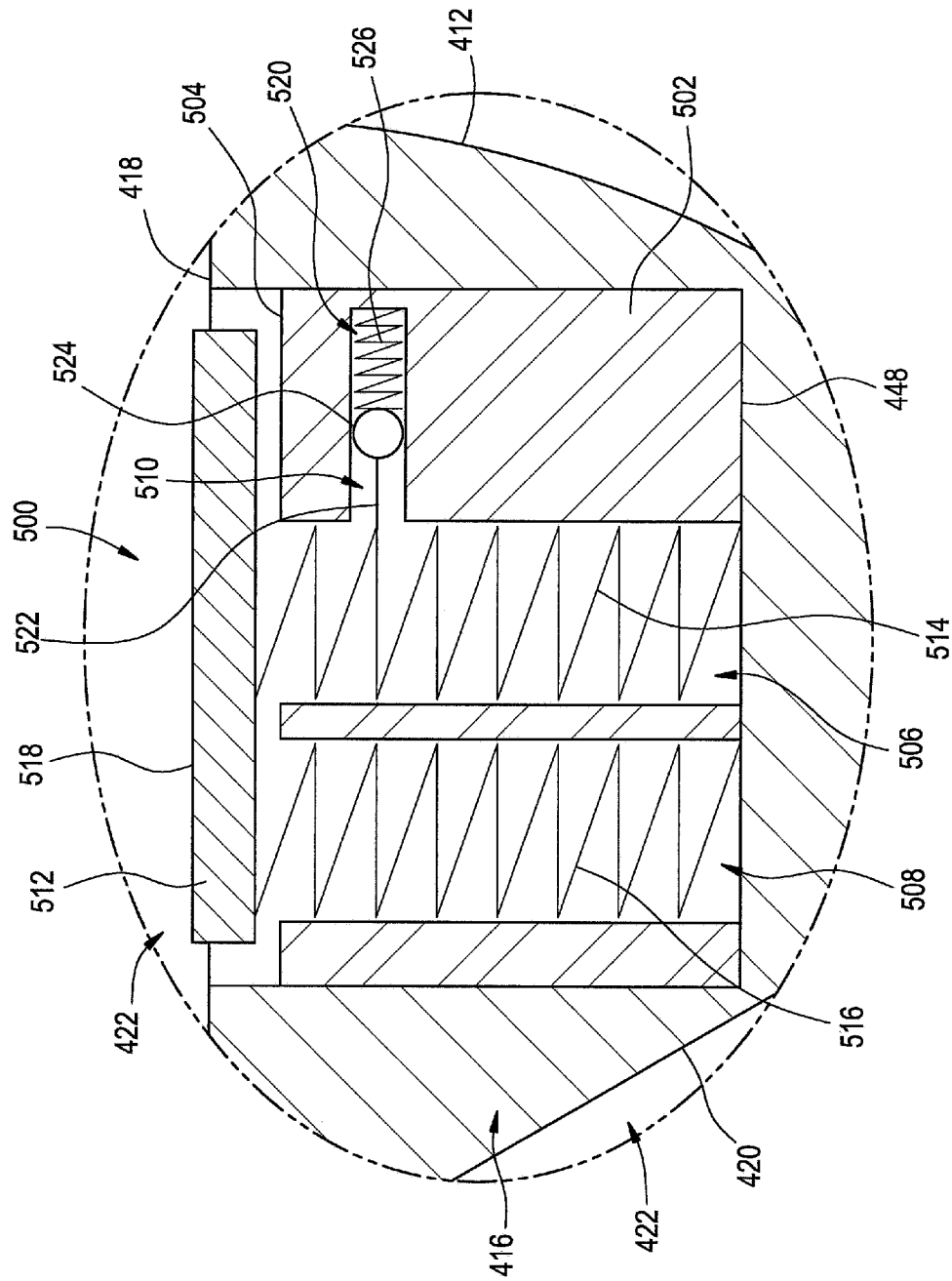
FIG. 11 is an enlarged view of the portion of the component in FIG. 8 identified as Detail 10 therein and illustrating another example of an isolator assembly in accordance with the subject matter of the present disclosure.

As indicated above, one or more of the components of a torsional coupler in accordance with the subject matter of the present disclosure can include one or more force-transfer elements through which torque and/or other rotational output is transmitted between the two components at least partially through the one or more force-transfer elements. As another non-limiting example, the plurality of force-transfer elements can take the form of a plurality of isolator assemblies 500 in accordance with the subject matter of the present disclosure, such as is shown in FIG. 11, for example. It will be appreciated that isolator assemblies 500 could be used in addition to, or as an alternative to, isolator assembly 446 illustrated in FIGS. 8 and 10. As such, it will be appreciated that a plurality of isolator assemblies 500 can be used in connection with either or both of the two end components (e.g., end component 402 and/or 404) such as by being at least partially received within cavities 448 of lugs 416, such as has been described above.

Isolator assemblies 500 can include an isolator block or housing 502 that is dimensioned to be received within one of cavities 448. Isolator block 502 can include an outer surface 504 disposed toward surface 418 of lugs 416. The isolator blocks can also include a plurality of passages, such as passages 506 and 508, for example, that extend into the isolator block from along outer surface 504 and are disposed transverse to surface 418. Isolator blocks 502 can further include one or more additional passages, such as passage 510, for example, that extends outwardly from along one or more of passages 506 and/or 508 in approximate alignment with outer surface 504 and/or surface 418.

Isolator assemblies 500 can also include a pressure pad 512 supported on isolator block 502 by way of one or more positive-stiffness biasing elements and one or more negative-stiffness biasing elements. In the arrangement shown in FIG. 11, for example, isolator assembly 500 includes a negative-stiffness biasing element 514 that is disposed within passage 506 and a positive-stiffness biasing element 516 that is disposed within passage 508. Pressure pad 512 can include an outer surface 518, which can, in some cases, be disposed relative to surface 418 such that outer surface 518 extends beyond surface 418 and into recess 422. Negative-stiffness biasing element 514 and positive-stiffness biasing element 516 can be operatively connected with pressure pad 512 and/or with one another in any suitable manner.

Isolator assemblies 500 can also, optionally, include a stabilizing element 520 that is at least partially formed by one or more connecting members 522 that are at least partially disposed within one of passages 510 and operatively connected to negative-stiffness biasing element 514. Though optional, stabilizing element 520 can be included to aid in maintaining position of negative-stiffness biasing element 514, which may, in some cases, have some inherent instability. Additionally, the one or more connecting members can be pivotally supported on isolator block 502 by pivot element 524. One or more biasing elements 526 can, optionally, operatively engage pivot elements 524 to thereby column-load or otherwise compress connecting members 522.

Generally, isolator assemblies 500 can operate such that torsional forces acting on component 402 are transmitted to component 404 through pressure pad 512, such as by outer surface 518 abuttingly engaging surface 436 of a lug of component 404. Positive-stiffness biasing element 516 can be dimensioned and include a positive stiffness (e.g., spring rate) sufficient to support pressure pad 512 under such torsional forces with a corresponding deflection. Negative-stiffness biasing element 514 can include a negative stiffness that acts in parallel with the positive-stiffness element, and can substantially reduce the overall combined stiffness of the biasing elements 514 and 516. In this manner, the stiffness of the isolator assemblies can be made to approach zero while the positive-stiffness biasing element supports the forces and loads acting on pressure pad 512.

Figure 12:
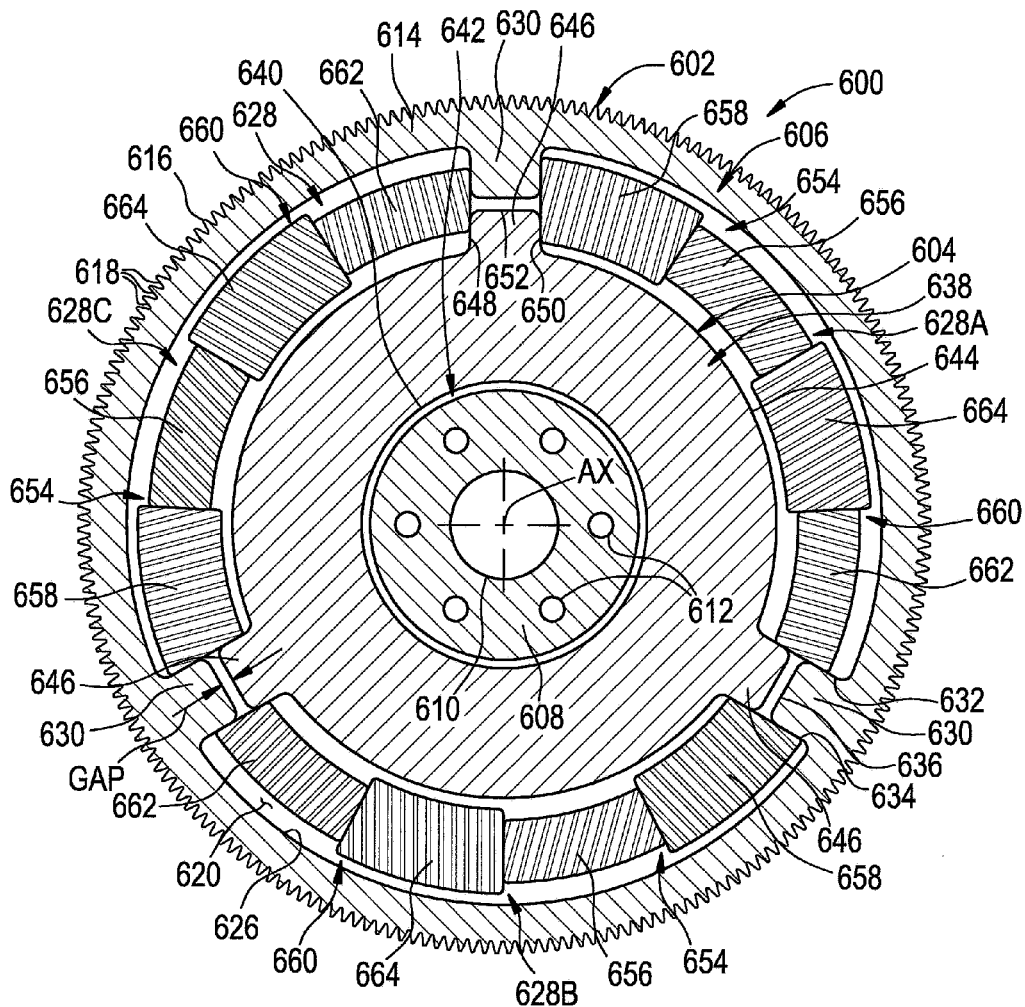
FIG. 12 is a front elevation view of still another example of a torsional coupler in accordance with the subject matter of the present disclosure with a driving component, a driven component and a plurality of isolator assemblies disposed in a first rotational condition.
Figure 13:
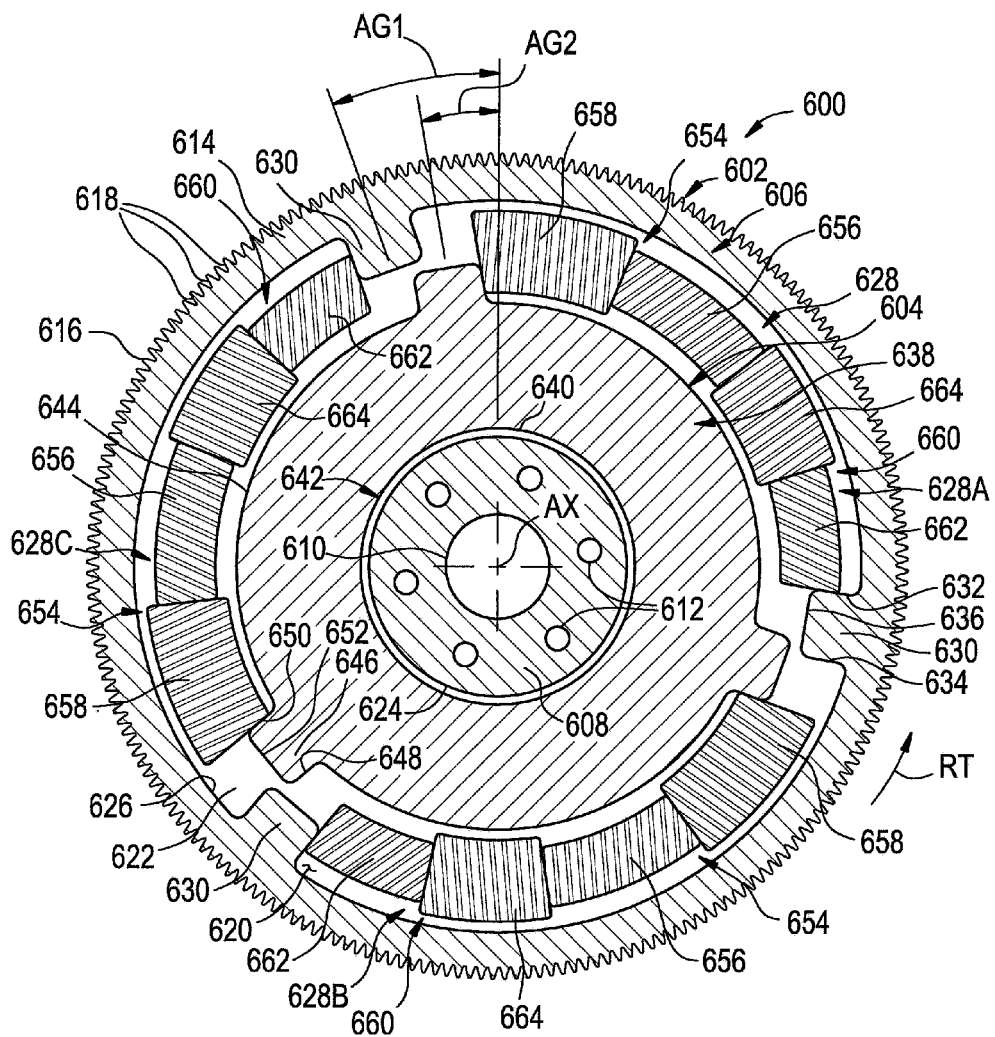
FIG. 13 is a front elevation view of the torsional coupler in FIG. 12 with the driving component, driven component and plurality of isolator assemblies disposed in a second rotational condition.

A further example of a torsional transmission device in accordance with the subject matter of the present disclosure is shown as a torsional coupler 600 in FIGS. 12 and 13. Coupler 600 can include an end member (or end component) 602 and an end member (or end component) 604 that are operatively interengaged with one another such that torsional and/or rotational output can be transmitted from one end component to the other in accordance with the subject matter of the present disclosure. In an assembled condition, coupler 600 can include axially-opposed sides, such as are represented in FIG. 2 by reference numbers SD1 and SD2. In some cases, components 602 and 604 can be assembled together such that the components are maintained in a substantially fixed axial relation relative to one another. In other cases, however, some amount of axial movement may be permitted, such as may be useful in clutch-type applications, for example.

Additionally, in some cases, one or more connection and/or securement features can be accessible from along either or both of sides SD1 and/or SD2, such as may be suitable for operatively connecting one or more end components (e.g., end member 602 and/or end member 604) to an associated rotational motion source (e.g., driving component 102) and/or an associated rotational motion target (e.g., driven component 104). As indicated above, however, it will be appreciated that labels such as "driven" and "driving" are merely indicative of a relative direction of torque transmission at a given point in time, and that such labels are not intended to be limiting.

Component 602 is shown in FIGS. 12 and 13 as including a component body 606 with a body wall (not numbered) that includes an inner wall portion 608 that at least partially defines a mounting passage 610 dimensioned to receive an associated shaft or other associated component (not shown). In some cases, inner wall portion 608 can include one or more securement features. As one example, inner wall portion 608 is shown as including a plurality of mounting holes 612 that extend therethrough and that can be dimensioned to receive corresponding securement devices (not shown), such as threaded fasteners, for example, for use in securing the component to a rotational power source or other associated component.

Component body 606 is also shown as including an outer wall portion 614 that is spaced radially outward from inner wall portion 608 and can at least partially define an outer peripheral edge 616 of the component body. In some cases, a plurality of engagement features can be included along the outer peripheral edge. For example, component body 606 is shown in FIGS. 12 and 13 as, optionally, including a plurality of gear teeth 618 disposed in circumferentially-spaced relation to one another along the outer peripheral edge of component body 606.

Component body 606 can also include a side wall portion 620 that extends radially between inner wall portion 608 and outer wall portion 614. Side wall portion 620 can include an inboard surface 622 (FIG. 13) disposed in facing relation to component 604 and an outboard surface (not shown) facing away from component 604. In some cases, inner wall portion 608 and outer wall portion 614 can project axially-outward from along inboard surface 622. In such cases, inner wall portion 608 can have an outer peripheral surface 624 and outer wall portion 614 can include an inner peripheral surface 626 that at least partially define a pocket or recess 628 is at least partially formed within component body 606.

In some cases, one or more projections or lugs 630 can extend radially inward from along inner peripheral surface 626 of outer wall portion 614 and into recess 628. It will be appreciated that lugs 630 can be of any suitable size, shape and/or configuration, and that any suitable quantity or arrangement of lugs can be used. In the exemplary arrangement shown in FIGS. 12 and 13, for example, component 602 includes three lugs that are disposed in spaced relation to one another peripherally about axis AX of the component body, and include opposing side surfaces 632 and 634 as well as a distal end surface 636.

Component 604 is shown in FIGS. 12 and 13 as including a component body 638 with a body wall (not numbered) that includes an inner wall portion 640 that at least partially defines a mounting passage 642 dimensioned to receive at least a portion of inner wall portion 608 of component 602. In some cases, inner wall portion 640 can be supported along outer peripheral surface 624 of inner wall portion 608 such that component 604 can rotate relative to component 602. In some cases, a friction-reducing element (not shown) can be disposed between outer peripheral surface 624 and inner wall portion 640. Additionally, it will be appreciated that the component body of component 604 can include any suitable number of one or more features (not shown) and/or components (not shown) for operatively connecting component 604 to an associated rotational power source or other associated element. As one non-limiting example, securement features, such as threaded passages, could extend into component body 638, such as has been described above in connection with securement features 444 of end component 402 in FIG. 9, for example.

The body wall of component body 638 extends in a radially outward direction from inner wall portion 640 to an outer peripheral edge 644. In some cases, one or more projections or lugs 646 can extend radially outward from along outer peripheral edge 644 and into recess 628. It will be appreciated that lugs 646 can be of any suitable size, shape and/or configuration, and that any suitable quantity or arrangement of lugs can be used. In the exemplary arrangement shown in FIGS. 12 and 13, for example, component 604 includes three lugs that are disposed in spaced relation to one another peripherally about axis AX of the component body in generally aligned relation to lugs 630 of component 602. Additionally, lugs 646 can include opposing side surfaces 648 and 650 as well as a distal end surface 652 disposed in radially inward spaced relation to distal end surfaces 636 of lugs 630 such that a gap or space is formed between distal end surfaces 636 and 652, as is represented in FIG. 12 by reference dimension GAP.

Component 604 is shown as being supported on component 602 such that component 604 is at least partially received within recess 628 and thereby separates a remaining portion of recess 628 into a plurality of recess portions. In the arrangement in FIGS. 12 and 13, for example, a plurality of recess portions 628A-628C are formed between outer peripheral edge 644 of component 604 and inner peripheral surface 626 of component 602. Recess portions 628A-628C are shown as having an approximately arcuate cross-sectional profile and extending between opposing ends (not numbered) that are at least partially defined by surfaces 632 and 648 on one end and surfaces 634 and 650 on the opposing end.

Additionally, a torsional coupler in accordance with the subject matter of the present disclosure can include one or more force-transfer elements through which torque and/or other rotational output is transmitted between the two end components at least partially through the one or more force-transfer elements. It will be appreciated that the one or more force-transfer elements can be of any suitable size, shape, configuration and/or arrangement, and can be disposed on, along or otherwise associated with either or both of the two end components in any combination. In the exemplary arrangements discussed hereinafter, the one or more force-transfer elements can include one or more positive-stiffness biasing elements as well as one or more negative-stiffness biasing elements.

In the arrangement shown in FIGS. 12 and 13, coupler 600 includes a plurality of force-transfer elements, which can be of any suitable type, kind, construction and/or configuration. As one non-limiting example, the plurality of force-transfer elements can take the form of a plurality of isolator assemblies having at least one positive-stiffness biasing element and at least one negative-stiffness biasing element. It will be appreciated that the isolator assemblies can include any combination of positive-stiffness and negative-stiffness biasing elements.

For example, in the arrangement shown in FIGS. 12 and 13, torsional coupler 600 includes a plurality of isolator assemblies 654 with at least one of the isolator assemblies operatively disposed within one of recess portions 628A-628C. Isolator assemblies 654 are schematically represented as including a positive-stiffness biasing element 656 and a negative-stiffness biasing element 658 that is operatively connected to the positive-stiffness biasing element. In the arrangement shown in FIGS. 12 and 13, biasing elements 656 and 658 are operatively connected in series with one another. It will be appreciated, however, that any other suitable configuration and/or arrangement could alternately be used. For example, biasing elements 656 and 658 could, alternately, be operatively connected in parallel with one another.

In some cases, a torsional transmission device in accordance with the subject matter of the present disclosure can include one or more isolator assemblies of two or more types, kinds, constructions, configurations, and/or performance characteristics. For example, torsional coupler 600 is shown in FIGS. 12 and 13 as including a plurality of isolator assemblies 660 that are schematically represented as including a positive-stiffness biasing element 662 and a negative-stiffness biasing element 664 that is operatively connected to the positive-stiffness biasing element. Biasing elements 662 and 664 are shown as being operatively connected in series with one another. It will be appreciated, however, that any other suitable configuration and/or arrangement could alternately be used. For example, the biasing elements could, alternately, be operatively connected in parallel with one another.

Additionally, torsional coupler 600 is shown as including one of isolator assemblies 654 and one of isolator assemblies 660 disposed in operative association with one another within each of recess portions 628A-628C. In the configuration shown in FIGS. 12 and 13, isolator assemblies 654 and 660 are operatively connected in series with one another. It will be appreciated, however, that any other suitable configuration and/or arrangement could alternately be used. For example, the isolator assemblies could be operatively connected in parallel with one another.

As shown in FIG. 12, components 602 and 604 can be disposed in a first rotational orientation or condition. As shown in FIG. 13, components 602 and 604 can be displaced into a second rotational orientation or condition, such as may occur as a result of rotation in the direction identified by arrow RT. As a result of the inclusion and operative connection of isolator assemblies 654 and/or 660 between components 602 and 604, however, it will be recognized that components 602 and 604 can undergo angular displacements of different amounts or magnitudes, as is respectively represented in FIG. 13 by reference dimensions AG1 and AG2.

In the installed condition shown in FIG. 12, one of isolator assemblies 654 and one of isolator assemblies 660 are operatively connected in series with one another with such that isolator assembly 654 is disposed in operative engagement with side surfaces 634 and 650 and isolator assembly 660 is disposed in operative engagement with side surfaces 632 and 648. As one or more of isolator assemblies 654 and/or 660 is deflected within the recess channels, torque is transferred from one of components 602 and 604 to the other of components 602 and 604. Under such conditions of use, the difference in angular displacement represented by reference dimensions AG1 and AG2 can occur.

It will be appreciated that the positive-stiffness biasing elements can include a positive stiffness (e.g., spring rate) sufficient to support the torsional forces with a corresponding deflection and that the negative-stiffness biasing elements can include a negative stiffness that acts in series with the positive-stiffness element. In this manner a substantially reduction in the overall combined stiffness of the biasing elements can be achieved. In this manner, the stiffness of the isolator assemblies can be made to approach zero while the positive-stiffness biasing element supports the forces and loads acting on coupler.

In cases in which isolator assemblies 654 and 660 are of different sizes, shapes, constructions, configurations and/or have different performance characteristics, it will be recognized and appreciated that the isolator assemblies can perform differently during use in operation and that such different performance characteristics may provide one or more desirable features and/or benefits. In the arrangement shown in FIGS. 12 and 13, for example, isolator assemblies 660 are shown as deflecting a greater amount than isolator assemblies 654. It will be appreciated, however, that other configurations and/or arrangements could alternately be used.

Figure 14:
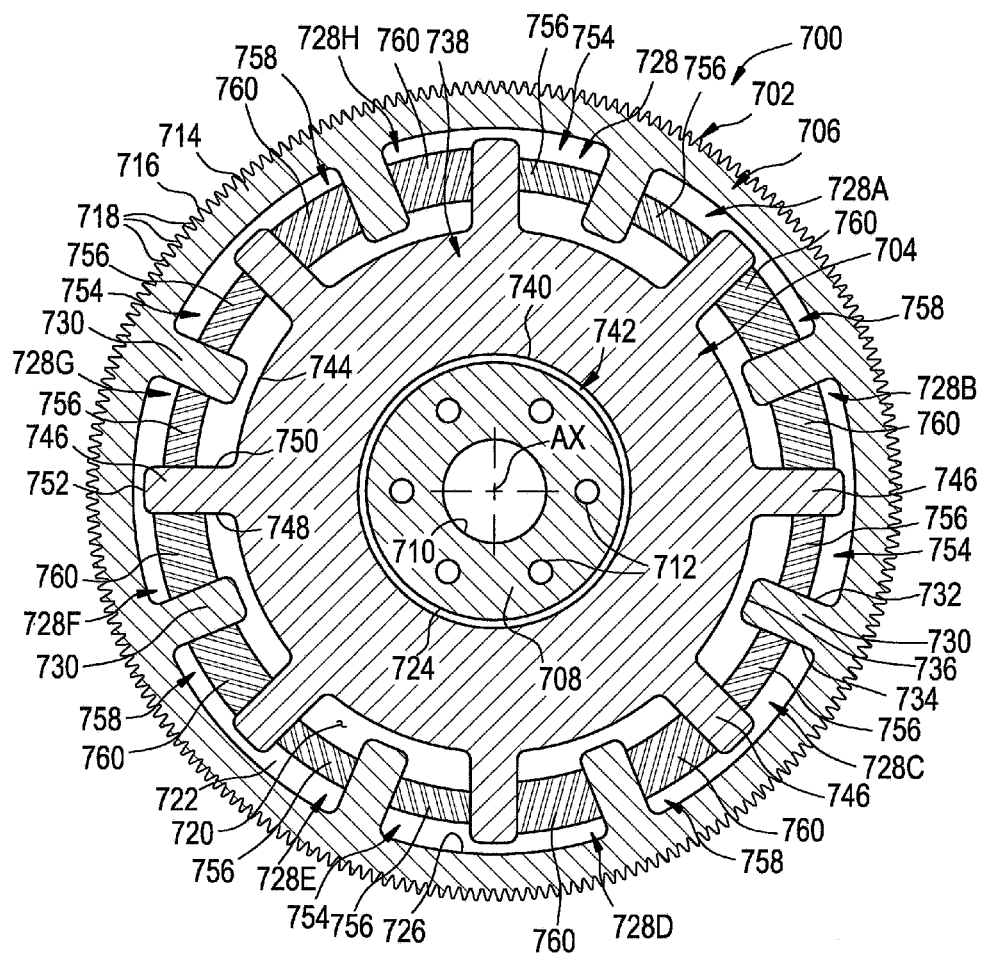
FIG. 14 is a front elevation view of still a further example of a torsional coupler in accordance with the subject matter of the present disclosure with a driving component, a driven component and a plurality of isolator assemblies disposed in a first rotational condition.
Figure 15:
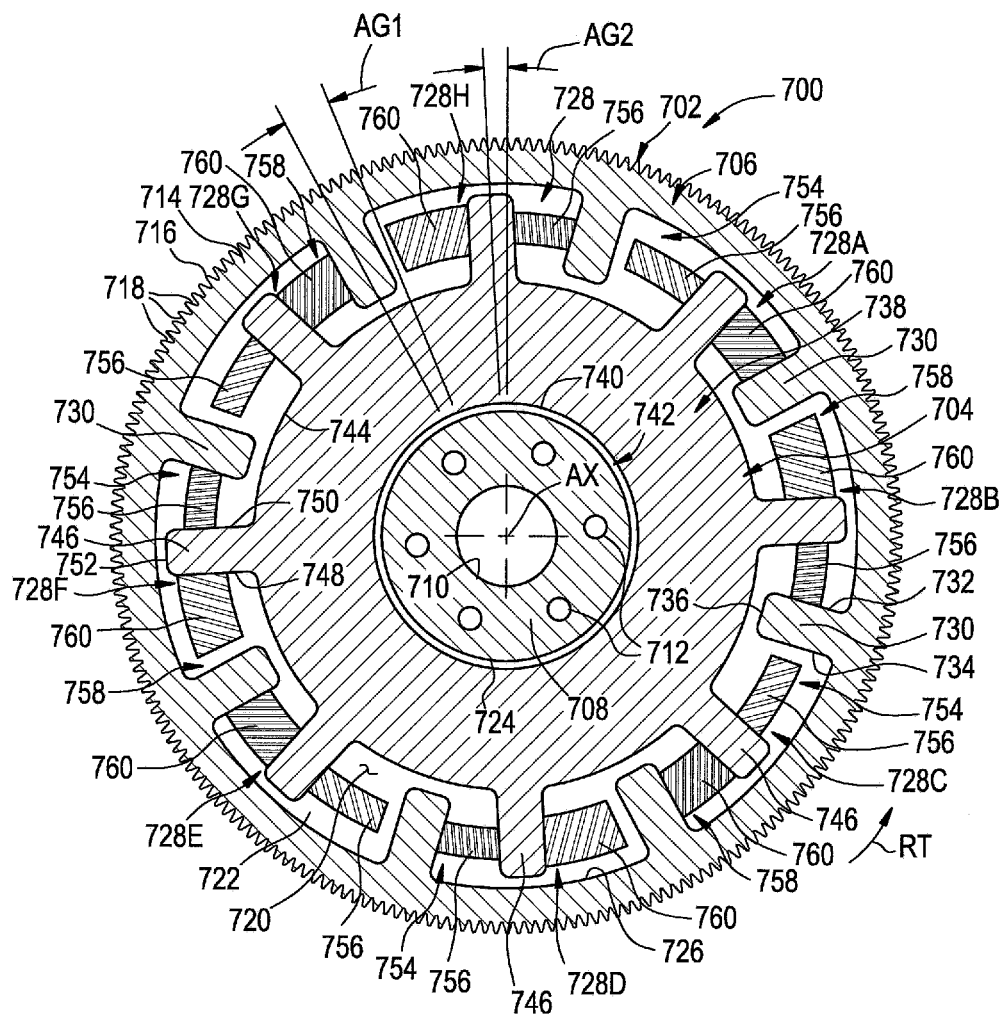
FIG. 15 is a front elevation view of the torsional coupler in FIG. 14 with the driving component, driven component and plurality of isolator assemblies disposed in a second rotational condition.

Still another example of a torsional transmission device in accordance with the subject matter of the present disclosure is shown as a torsional coupler 700 in FIGS. 14 and 15. Coupler 700 can include an end member (or end component) 702 and an end member (or end component) 704 that are operatively interengaged with one another such that torsional and/or rotational output can be transmitted from one end component to the other in accordance with the subject matter of the present disclosure. In an assembled condition, coupler 700 can include axially-opposed sides, such as are represented in FIG. 2 by reference numbers SD1 and SD2. In some cases, components 702 and 704 can be assembled together such that the components are maintained in a substantially fixed axial relation relative to one another. In other cases, however, some amount of axial movement may be permitted, such as may be useful in clutch-type applications, for example.

Additionally, in some cases, one or more connection and/or securement features can be accessible from along either or both of sides SD1 and/or SD2, such as may be suitable for operatively connecting one or more end components (e.g., end member 702 and/or end member 704) to an associated rotational motion source (e.g., driving component 102) and/or an associated rotational motion target (e.g., driven component 104). As indicated above, however, it will be appreciated that labels such as "driven" and "driving" are merely indicative of a relative direction of torque transmission at a given point in time, and that such labels are not intended to be limiting.

Component 702 is shown in FIGS. 14 and 15 as including a component body 706 with a body wall (not numbered) that includes an inner wall portion 708 that at least partially defines a mounting passage 710 dimensioned to receive an associated shaft or other associated component (not shown). In some cases, inner wall portion 708 can include one or more securement features. As one example, inner wall portion 708 is shown as including a plurality of mounting holes 712 that extend therethrough and that can be dimensioned to receive corresponding securement devices (not shown), such as threaded fasteners, for example, for use in securing the component to a rotational power source or other associated component.

Component body 706 is also shown as including an outer wall portion 714 that is spaced radially outward from inner wall portion 708 and can at least partially define an outer peripheral edge 716 of the component body. In some cases, a plurality of engagement features can be included along the outer peripheral edge. For example, component body 706 is shown in FIGS. 14 and 15 as, optionally, including a plurality of gear teeth 718 disposed in circumferentially-spaced relation to one another along the outer peripheral edge of component body 706.

Component body 706 can also include a side wall portion 720 that extends radially between inner wall portion 708 and outer wall portion 714. Side wall portion 720 can include an inboard surface 722 (FIG. 15) disposed in facing relation to component 704 and an outboard surface (not shown) facing away from component 704. In some cases, inner wall portion 708 and outer wall portion 714 can project axially-outward from along inboard surface 722. In such cases, inner wall portion 708 can have an outer peripheral surface 724 and outer wall portion 714 can include an inner peripheral surface 726 that at least partially define a pocket or recess 728 is at least partially formed within component body 706.

In some cases, one or more projections or lugs 730 can extend radially inward from along inner peripheral surface 726 of outer wall portion 714 and into recess 728. It will be appreciated that lugs 730 can be of any suitable size, shape and/or configuration, and that any suitable quantity or arrangement of lugs can be used. In the exemplary arrangement shown in FIGS. 14 and 15, for example, component 702 includes eight lugs that are disposed in spaced relation to one another peripherally about axis AX of the component body, and include opposing side surfaces 732 and 734 as well as a distal end surface 736.

Component 704 is shown in FIGS. 14 and 15 as including a component body 738 with a body wall (not numbered) that includes an inner wall portion 740 that at least partially defines a mounting passage 742 dimensioned to receive at least a portion of inner wall portion 708 of component 702. In some cases, inner wall portion 740 can be supported along outer peripheral surface 724 of inner wall portion 708 such that component 704 can rotate relative to component 702. In some cases, a friction-reducing element (not shown) can be disposed between outer peripheral surface 724 and inner wall portion 740. Additionally, it will be appreciated that the component body of component 704 can include any suitable number of one or more features (not shown) and/or components (not shown) for operatively connecting component 704 to an associated rotational power source or other associated element. As one non-limiting example, securement features, such as threaded passages, could extend into component body 738, such as has been described above in connection with securement features 444 of end component 402 in FIG. 9, for example.

The body wall of component body 738 extends in a radially outward direction from inner wall portion 740 to an outer peripheral edge 744. In some cases, one or more projections or lugs 746 can extend radially outward from along outer peripheral edge 744 and into recess 728. It will be appreciated that lugs 746 can be of any suitable size, shape and/or configuration, and that any suitable quantity or arrangement of lugs can be used. In the exemplary arrangement shown in FIGS. 14 and 15, for example, component 704 includes eight lugs that are disposed in spaced relation to one another peripherally about axis AX of the component body. Additionally, lugs 746 can include opposing side surfaces 748 and 750 as well as a distal end surface 752.

In the construction shown in FIGS. 14 and 15, lugs 730 extend radially inward from along inner peripheral surface 726 such that distal end surfaces 736 are disposed in radially inward with respect to distal end surfaces 752 of lugs 746. Similarly, lugs 746 extend radially outward from along outer peripheral edge 744 such that distal end surfaces 752 are disposed radially outward with respect to distal end surfaces 736 of lugs 730. As a result, at least a portion of the length of lugs 730 and at least a portion of the length of lugs 746 are radially co-extensive with one another.

Component 704 is shown as being supported on component 702 such that component 704 is at least partially received within recess 728. Additionally, in the construction shown in FIGS. 14 and 15, end components 702 and 704 are rotationally positioned relative to one another about axis AX such that lugs 730 and 746 are interleaved with one another with circumferentially adjacent lugs alternate between lugs 730 and lugs 746. In this respect, one of lugs 746 is disposed approximately centrally between adjacent ones of lugs 730. In some cases, lugs 730 can be deemed to separate a remaining portion of recess 728 into a plurality of recess portions. In the arrangement in FIGS. 14 and 15, for example, a plurality of recess portions 728A-728H are formed between outer peripheral edge 744 of component 704 and inner peripheral surface 726 of component 702 between adjacent ones of lugs 730. Recess portions 728A-728H are shown as having an approximately arcuate cross-sectional profile and extending between opposing ends (not numbered) that are at least partially defined by surfaces 732 and 734 of adjacent ones of lugs 730.

Additionally, a torsional coupler in accordance with the subject matter of the present disclosure can include one or more force-transfer elements through which torque and/or other rotational output is transmitted between the two end components at least partially through the one or more force-transfer elements. It will be appreciated that the one or more force-transfer elements can be of any suitable size, shape, configuration and/or arrangement, and can be disposed on, along or otherwise associated with either or both of the two end components in any combination.

In the arrangement shown in FIGS. 14 and 15, coupler 700 includes a plurality of force-transfer elements, which can be of any suitable type, kind, construction and/or configuration. As one non-limiting example, the plurality of force-transfer elements can take the form of a plurality of isolator assemblies including at least one positive-stiffness biasing element and a plurality of isolator assemblies including at least one negative-stiffness biasing element. It will be appreciated that the isolator assemblies can respectively include any combination and/or configuration of positive-stiffness biasing elements and negative-stiffness biasing elements.

For example, in the arrangement shown in FIGS. 14 and 15, torsional coupler 700 includes a plurality of isolator assemblies 754 with at least one of the isolator assemblies operatively disposed within each of recess portions 728A, 728C, 728E and 728G. Isolator assemblies 754 are schematically represented as including at least two positive-stiffness biasing elements 756 disposed within a corresponding one of recess portions 728A, 728C, 728E and 728G with one of biasing elements 756 operatively disposed between lug 746 therein and an adjacent one of lugs 730. More specifically, biasing elements 756 can, in some cases, be disposed in abutting engagement between surface 732 of lug 730 and surface 750 of lug 746, or between surface 734 of lug 730 and surface 748 of lug 746.

Additionally, torsional coupler 700 includes a plurality of isolator assemblies 758 with at least one of the isolator assemblies operatively disposed within each of recess portions 728B, 728D, 728F and 728H. Isolator assemblies 758 are schematically represented as including at least two negative-stiffness biasing elements 760 disposed within a corresponding one of recess portions 728B, 728D, 728F and 728H with one of biasing elements 760 operatively disposed between lug 746 therein and an adjacent one of lugs 730. As such, biasing elements 760 can also, in some cases, be disposed in abutting engagement between surface 732 of lug 730 and surface 750 of lug 746, or between surface 734 of lug 730 and surface 748 of lug 746.

It will be appreciated that isolator assemblies 754 and 758 are disposed in rotationally indexed or otherwise interleaved relation to one another. In this manner, positive-stiffness biasing elements 756 of isolator assemblies 754 and negative-stiffness biasing elements 760 of isolator assemblies 758 are operatively connected in parallel with one another. As such, it will be appreciated that the positive-stiffness biasing elements can include a positive stiffness (e.g., spring rate) sufficient to support the torsional forces with a corresponding deflection and that the negative-stiffness biasing elements can include a negative stiffness that acts in parallel with the positive-stiffness element. In this manner a substantially reduction in the overall combined stiffness of the biasing elements can be achieved. In this manner, the stiffness of the isolator assemblies can be made to approach zero while the positive-stiffness biasing element supports the forces and loads acting on coupler.

In some cases, a torsional transmission device in accordance with the subject matter of the present disclosure can include one or more isolator assemblies of two or more types, kinds, constructions, configurations, and/or performance characteristics. Though not shown in FIGS. 14 and 15, it will be appreciated that torsional coupler 700 could include additional positive-stiffness biasing elements and/or additional negative-stiffness biasing elements having differing stiffness values, such as has been described above in connection with coupler 600 in FIGS. 12 and 13, for example.

As shown in FIG. 14, components 702 and 704 can be disposed in a first rotational orientation or condition. As shown in FIG. 15, components 702 and 704 can be displaced into a second rotational orientation or condition, such as may occur as a result of rotation in the direction identified by arrow RT. As a result of the inclusion and operative connection of isolator assemblies 754 and 758 between components 702 and 704, however, it will be recognized that components 702 and 704 can undergo angular displacements of different amounts or magnitudes, as is respectively represented in FIG. 15 by reference dimensions AG1 and AG2, with reference dimension AG1 corresponding to the displacement of end component 702 and reference dimension AG2 corresponding to a reduced displacement of end component 704.

In the installed condition shown in FIG. 14, isolator assemblies 754 and isolator assemblies 758 are operatively connected in parallel with one another. As end components 702 and 704 are displaced relative to one another in a first direction of rotation, certain ones of biasing elements 756 and 760 are compressed. As end components 702 and 704 are displaced relative to one another in a second (i.e., opposing) direction of rotation, certain other ones of biasing elements 756 and 760 are compressed. Under such conditions of use, the difference in angular displacement represented by reference dimensions AG1 and AG2 can occur.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas", if used herein, can broadly refer to any gaseous or vaporous fluid. Most commonly, air is used as the working medium of devices, such as those described herein. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A torsional coupler dimensioned for securement between an associated rotational motion source and an associated rotational motion target, said torsional coupler comprising:
a first end component having an axis of rotation and a first component body, said first component body including:
an inner side wall including a plurality of outer surface portions;
an outer side wall disposed radially outward of said inner side wall and including a plurality of inner surface portions;
a plurality of first lugs each including a lug wall extending between and operatively interconnecting said inner side wall and said outer side wall, said lug walls having a first side surface and a second side surface spaced peripherally from said first side surface, said plurality of first lugs disposed in circumferentially-spaced relation to one another about said axis such that a plurality of first recesses extend into said first component body with one of said first recesses disposed between adjacent ones of said first lugs and including an endless periphery defined at least in part by one of said plurality of outer surface portion of said inner side wall, one of said plurality of inner surface portion of said outer side wall, a first side surface of one of said first lugs and a second side surface of an adjacent one of said first lugs;
a second end component having an axis of rotation and a second component body, said second component body including a plurality of second lugs having a first side surface and a second side surface spaced peripherally from said first side surface, said plurality of second lugs disposed in circumferentially-spaced relation to one another about said axis such that a plurality of second recesses extend into said second component body with one of said second recesses disposed between adjacent ones of said second lugs;
said first end component and said second end component being at least approximately co-axially aligned with one another as well as axially positioned and rotationally oriented relative to one another such that each one of said plurality of first lugs is at least partially received within one of said plurality of second recesses and each one of said plurality of second lugs is at least partially received within one of said plurality of first recesses and with said side surfaces of said plurality of first lugs being disposed in facing relation and co-extensive with said side surfaces of said plurality of second lugs; and,
a plurality of force-transfer elements disposed between side surfaces of adjacent ones of said pluralities of first and second lugs such that rotational motion imparted on one of said first and second end components can be transmitted to the other of said first and second end components through said plurality of force-transfer elements in at least one direction of rotation about said axis.

2. A torsional coupler according to claim 1, wherein said plurality of force-transfer elements include one of a plurality of pressurizable elements and a plurality of biasing elements with said plurality of biasing elements including one or more biasing elements having a positive stiffness and one or more biasing elements having a negative stiffness.

3. A torsional coupler according to claim 2, wherein said force-transfer elements include a plurality of pressurizable elements including an element chamber constructed to receive and retain a quantity of pressurized fluid for an extended period of time.

4. A torsional coupler according to claim 3, wherein said plurality of pressurizable elements include an element wall that at least partially defines said element chamber.

5. A torsional coupler according to claim 4, wherein said element wall is formed from at least one of a substantially rigid metal material, a substantially rigid thermoplastic polymer material, a thermoplastic elastomer material, a natural rubber material and a synthetic rubber material.

6. A torsional coupler dimensioned for securement between an associated rotational motion source and an associated rotational motion target, said torsional coupler comprising:
a first end component having an axis of rotation and a first component body, said first component body including;
an inner side wall including a plurality of outer surface portions;
an outer side wall disposed radially outward of said inner side wall and including a plurality of inner surface portions;
an end wall extending radially between said inner side wall and said outer side wall; and,
a plurality of first lugs projecting from said end wall with each of said plurality of first lugs including opposing side surfaces;
said plurality of first lugs disposed in circumferentially-spaced relation to one another about said axis such that said side surfaces of adjacent first lugs are disposed in facing relation to one another and such that a plurality of first recesses extend into said first component body with one of said first recesses disposed between adjacent ones of said first lugs, each of said plurality of recesses including an endless periphery defined at least in part by one of said plurality of outer surface portion of said inner side wall, one of said plurality of inner surface portion of said outer side wall and said facing side surfaces of said adjacent first lugs;
a second end component having an axis of rotation and a second component body, said second component body including an end wall and a plurality of second lugs projecting from said end wall with each of said plurality of second lugs including opposing side surfaces, said plurality of second lugs disposed in circumferentially-spaced relation to one another about said axis such that said side surfaces of adjacent second lugs are disposed in facing relation to one another and such that a plurality of second recesses extend into said second component body with one of said second recesses disposed between adjacent ones of said second lugs; and,
a plurality of pressurizable elements including an element chamber constructed to receive and retain a quantity of pressurized fluid for an extended period of time;
said first end component and said second end component being at least approximately co-axially aligned with one another as well as axially positioned and rotationally oriented relative to one another such that each one of said plurality of first lugs is at least partially received within one of said plurality of second recesses and each one of said plurality of second lugs is at least partially received within one of said plurality of first recesses and with said side surfaces of said plurality of first lugs being disposed in facing relation and co-extensive with said side surfaces of said plurality of second lugs; and, said plurality of pressurizable elements disposed between side surfaces of adjacent ones of said pluralities of first and second lugs such that rotational motion imparted on one of said first and second end components can be transmitted to the other of said first and second end components through said plurality of pressurizable elements in at least one direction of rotation about said axis.

7. A torsional coupler according to claim 1, wherein said plurality of pressurizable elements include an element wall that at least partially forms said element chamber of said pressurizable elements.

8. A torsional coupler according to claim 7, wherein said element wall is formed from at least one of a thermoplastic elastomer material, a natural rubber material and a synthetic rubber material.

9. A torsional coupler according to claim 1, wherein said first component body includes a first securement feature dimensioned to operatively connect said first end component to one of the associated rotational motion source and the associated rotational motion target, and said second component body includes a second securement feature dimensioned to operatively connect said second end component to the other of the associated rotational motion source and the associated rotational motion target.

10. A torsional coupler according to claim 9, wherein said first securement feature includes at least one of a passage having a non-circular cross-sectional shape extending into said first component body and a plurality of threaded passages extending into said first component body.

11. A torsional coupler according to claim 9, wherein said second securement feature includes at least one of a passage having a non-circular cross-sectional shape extending into said second component body and a plurality of threaded passages extending into said second component body.

12. A torsional coupler according to claim 1, wherein each first lug of said plurality of first lugs includes a lug wall extending continuously between and operatively connecting said inner side wall and said outer side wall.

13. A torsional coupler according to claim 1, wherein said inner side wall projects from said end wall in an approximately axial direction and extends substantially continuously about said axis of rotation of said first end component.

14. A torsional coupler according to claim 1, wherein said outer side wall projects from said end wall in an approximately axial direction and extends substantially continuously about said axis of rotation of said first end component.

15. A torsional coupler according to claim 1, wherein each second lug of said plurality of second lugs includes:
  an inner end surface portion disposed in facing relation to said outer surface portion of said inner side wall of said first end component;
  an outer end surface portion disposed in facing relation to said inner surface portion of said outer side wall of said first end component; and,
  an endless outer periphery at least partially defined by said inner end surface, said outer end surface and said opposing side surfaces.

16. A torsional coupler according to claim 15, wherein said endless periphery of each first recess of said plurality of first recesses is greater than said endless outer periphery of each second lug of said plurality of second lugs such that each second lug of said plurality of second lugs fit within a corresponding one first recess of said plurality of first recesses.

17. A torsional coupler according to claim 15, wherein each first recess of said plurality of first recesses has an approximately common size and shape, and each second lug of said plurality of second lugs has an approximately common size and shape.

18. A rotary power transmission comprising:
  a rotational motion source configured to generate rotational motion;
  a rotational motion target configured to be driven by said rotational motion source; and,
  a torsional coupler operatively connected between said rotational motion source and said rotational motion target, said torsional coupler including:
    a first end component having an axis of rotation and a first component body, said first component body including:
      an inner side wall;
      an outer side wall disposed radially outward from said inner side wall; and,
      a plurality of first lugs extending between and operatively connecting said inner side wall and said outer side wall with each of said plurality of first lugs including opposing side surfaces extending between said inner side wall and said outer side wall, said plurality of first lugs disposed in circumferentially-spaced relation to one another about said axis such that a plurality of first recesses extend into said first component body with one of said first recesses disposed between adjacent ones of said first lugs;
    a second end component having an axis of rotation and a second component body, said second component body including a plurality of second lugs with each of said plurality of second lugs including opposing side surfaces, said plurality of second lugs disposed in circumferentially-spaced relation to one another about said axis such that a plurality of second recesses extend into said second component body with one of said second recesses disposed between adjacent ones of said second lugs; and,
    a plurality of pressurizable elements including an element chamber constructed to receive and retain a quantity of pressurized fluid for an extended period of time;
    said first end component and said second end component being at least approximately co-axially aligned with one another as well as axially positioned and rotationally oriented relative to one another such that each one of said plurality of first lugs is at least partially received within one of said plurality of second recesses and each one of said plurality of second lugs is at least partially received within one of said plurality of first recesses and with said side surfaces of said plurality of first lugs being disposed in facing relation and co-extensive with said side surfaces of said plurality of second lugs; and,
    each of said plurality of pressurizable elements disposed between side surfaces of adjacent ones of said pluralities of first and second lugs such that rotational motion imparted on one of said first and second end components can be transmitted to the other of said first and second end components through said plurality of pressurizable elements in at least one direction of rotation about said axis.

19. A rotary power transmission according to claim 18 further comprising a pressurized fluid system in fluid communication with said torsional coupler and operative to permit pressurized fluid transfer into and out of at least one of said plurality of pressurizable elements.

20. A rotary power transmission according to claim 19 further comprising a control system communicatively coupled with said pressurized fluid system and operative to selectively transfer pressurized fluid into and out of at least one of said plurality of pressurizable elements.

* * * * *